(12) United States Patent
Hachisuka

(10) Patent No.: US 8,154,826 B2
(45) Date of Patent: Apr. 10, 2012

(54) THIN-FILM MAGNETIC HEAD WITH VARIABLE-VOLUME CAVITY IN MEDIUM-OPPOSED SURFACE

(75) Inventor: Nozomu Hachisuka, Tokyo (JP)

(73) Assignee: TDK Corporation, Tokyo (JP)

( * ) Notice: Subject to any disclaimer, the term of this patent is extended or adjusted under 35 U.S.C. 154(b) by 968 days.

(21) Appl. No.: 12/139,809

(22) Filed: Jun. 16, 2008

(65) Prior Publication Data
US 2009/0310248 A1 Dec. 17, 2009

(51) Int. Cl.
*G11B 15/64* (2006.01)
(52) U.S. Cl. ....... 360/130.31; 360/90; 360/71; 360/231; 360/122
(58) Field of Classification Search ............. 360/75, 360/270, 290, 291, 241, 241.3, 122, 128, 360/125.3, 125.31, 125.71, 125.74, 130.31, 360/90, 71, 231, 130.21
See application file for complete search history.

(56) References Cited

U.S. PATENT DOCUMENTS

| | | | |
|---|---|---|---|
| 6,122,147 A | | 9/2000 | Fahimi et al. |
| 7,586,710 B2 * | | 9/2009 | Partee et al. .................... 360/75 |
| 7,623,322 B2 * | | 11/2009 | Umehara et al. .............. 360/317 |
| 7,911,738 B2 * | | 3/2011 | Kurita et al. ............. 360/125.74 |
| 2003/0174430 A1 | | 9/2003 | Takahashi et al. |
| 2005/0270694 A1 * | | 12/2005 | Umehara et al. .............. 360/126 |
| 2009/0122436 A1 * | | 5/2009 | Partee et al. .................... 360/75 |

FOREIGN PATENT DOCUMENTS

| | | |
|---|---|---|
| JP | A 2000-207800 | 7/2000 |
| JP | A 2001-6143 | 1/2001 |
| JP | A 2004-295951 | 10/2004 |
| JP | A 2006-18987 | 1/2006 |
| JP | A 2006-92709 | 4/2006 |

OTHER PUBLICATIONS

U.S. Appl. No. 11/958,123, filed Dec. 17, 2007, in the name of Nozomu Hachisuka et al.
U.S. Appl. No. 12/016,011, filed Jan. 17, 2008, in the name of Nozomu Hachisuka et al.

* cited by examiner

*Primary Examiner* — Will J Klimowicz
(74) *Attorney, Agent, or Firm* — Oliff & Berridge, PLC

(57) ABSTRACT

Provided is a thin-film magnetic head in which the magnetic spacing can be appropriately controlled by dynamically and accordingly, by adjusting the pressure working between the thin-film magnetic head and the magnetic recording medium according to the change of conditions such as the change over time. The thin-film magnetic head comprises at least one cavity for adjusting a pressure working between the thin-film magnetic head and the magnetic recording medium, provided in a surface of the head opposed to the magnetic recording medium, and a volume of the at least one cavity being variable. When the magnetic recording medium passes through near the cavity, the cavity generates a (negative) pressure that attracts the head and the medium toward each other. The amount of the negative pressure depends on the volume of the cavity; thus, a magnetic spacing $d_{MS}$ can be controlled dynamically and accordingly by adjusting the volume.

24 Claims, 10 Drawing Sheets

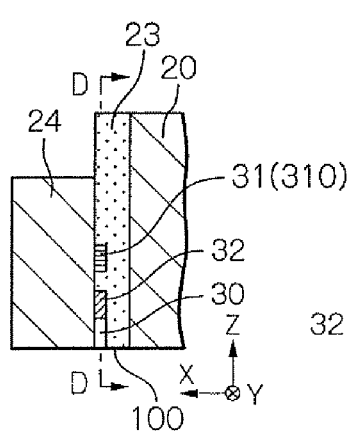
Fig. 4a1
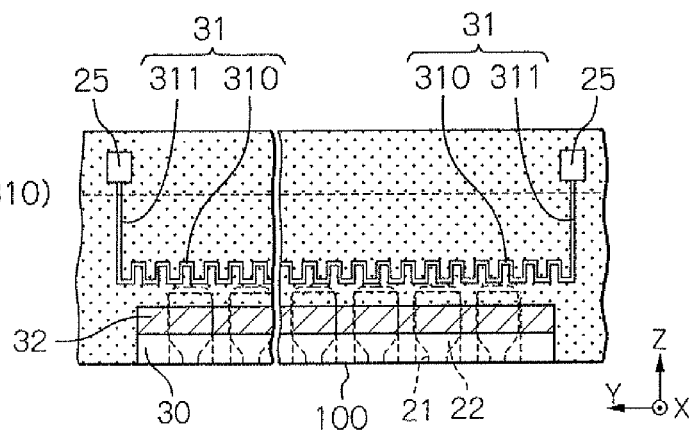
Fig. 4a2
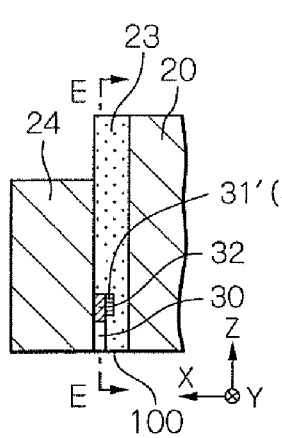
Fig. 4b1
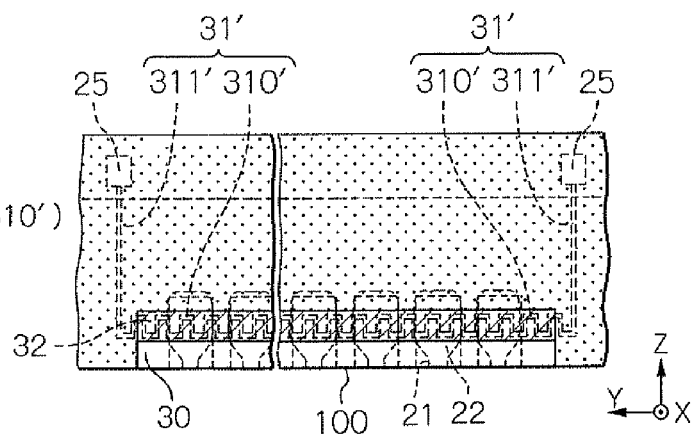
Fig. 4b2
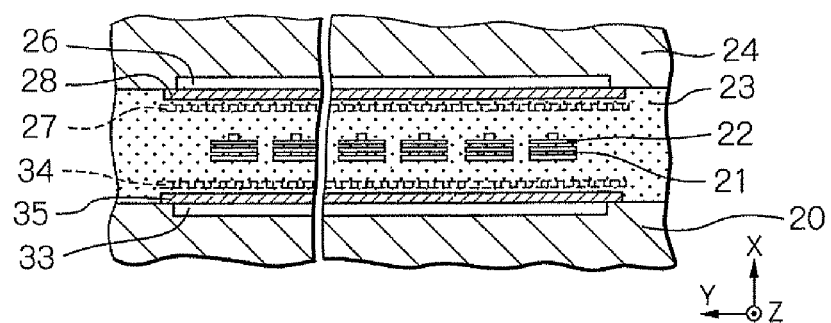
Fig. 4c Fig. 4d1
Fig. 4d2
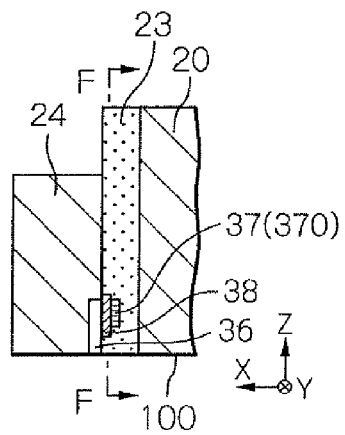
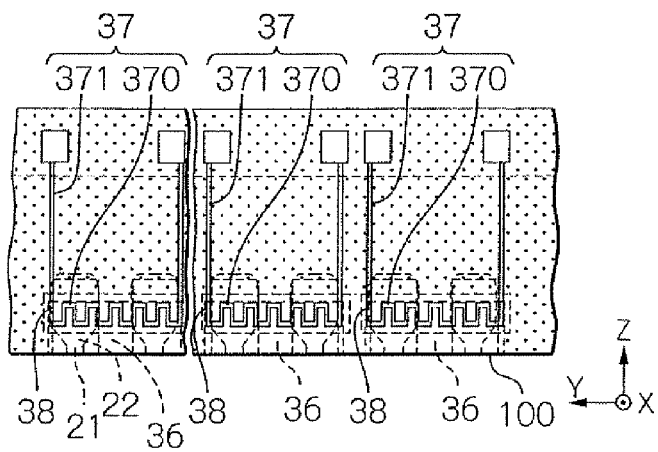
Fig. 4e1
Fig. 4e2
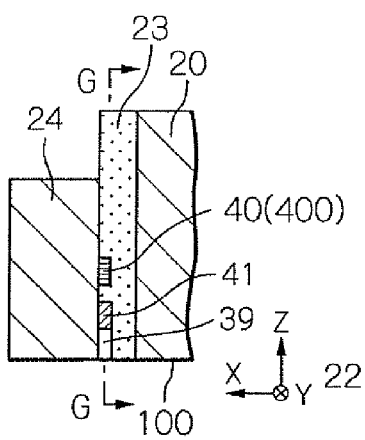
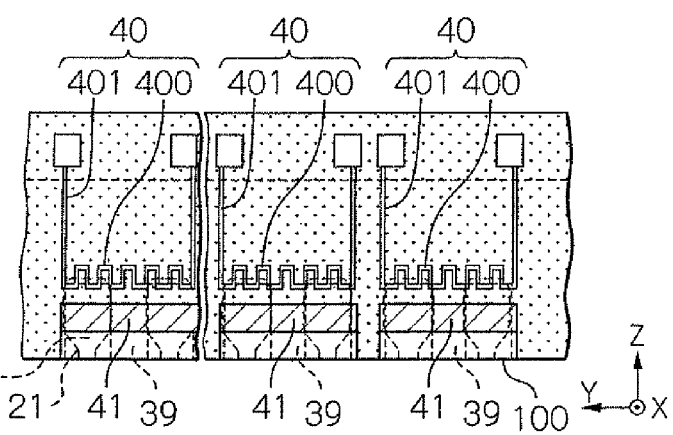
Fig. 4f1
Fig. 4f2
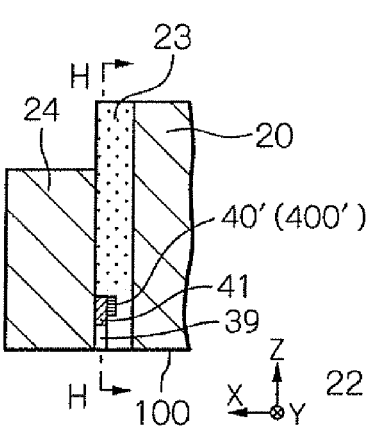
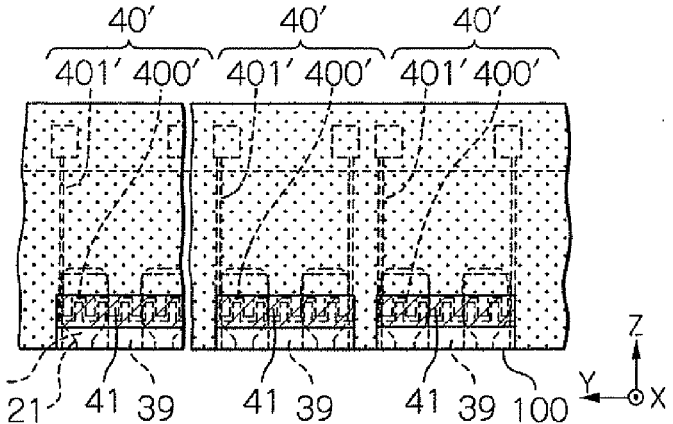

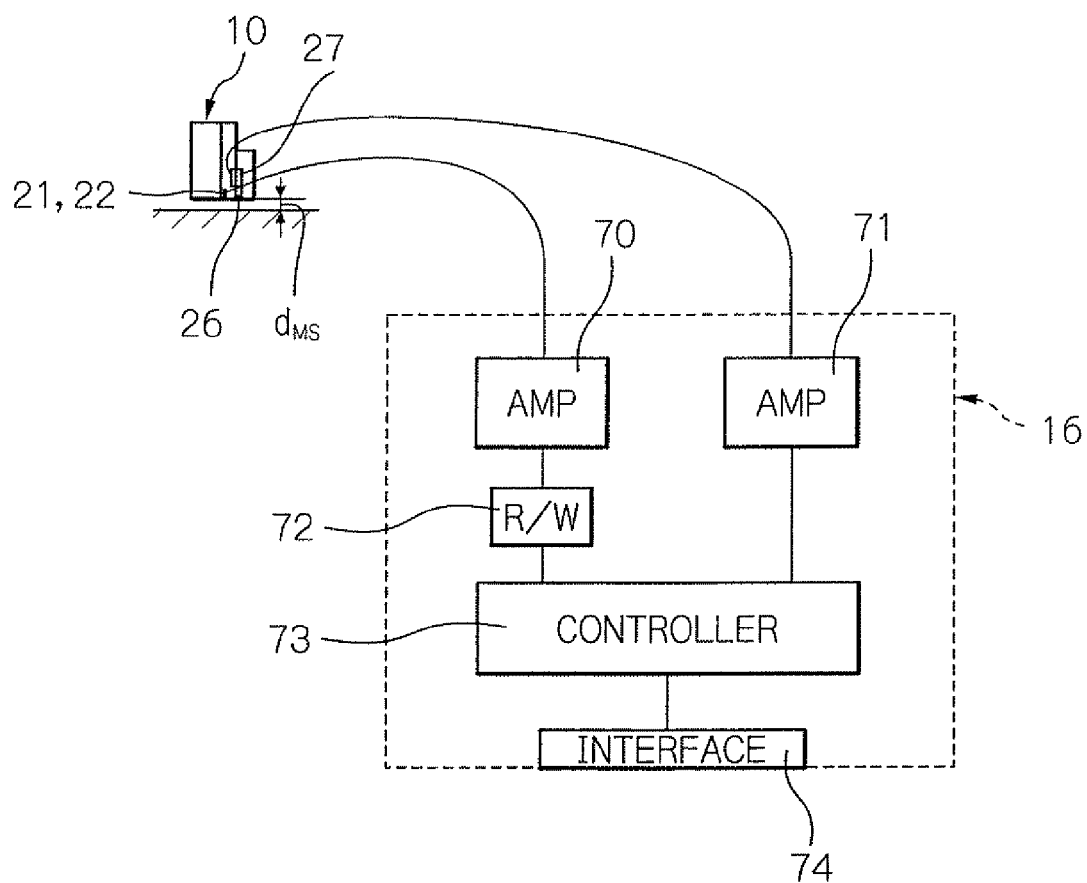

THIN-FILM MAGNETIC HEAD WITH VARIABLE-VOLUME CAVITY IN MEDIUM-OPPOSED SURFACE

BACKGROUND OF THE INVENTION

1. Field of the Invention

The present invention relates to a thin-film magnetic head used for magnetic recording, especially to a tape head for reading data from a magnetic tape and/or writing data to a magnetic tape. The present invention further relates to a magnetic tape apparatus provided with the tape head. The present invention furthermore relates to a method for controlling a magnetic spacing that is a distance between the end of the head element in the thin-film magnetic head and the surface of the magnetic record layer of the magnetic recording medium.

2. Description of the Related Art

In recent years, magnetic recording and reproducing apparatuses have been remarkably improved in capacity of storage data, corresponding to the widespread use of multimedia and the Internet. And magnetic tape apparatuses for backing up or storing data or for recording and reproducing audio video information are no exception of this trend of larger capacity, and have been required to be improved in areal recording density corresponding to the larger capacity.

Thin-film magnetic heads are widely used, in the above-described magnetic recording and reproducing apparatuses, for writing data to a magnetic recording medium and reading data from the medium. The thin-film magnetic heads have also been strongly required to be improved in performance corresponding to the larger capacity. Especially, it has been significantly important to appropriately control a magnetic spacing in order to stably perform read and write operations under higher recording density and to maintain original lifetime of the thin-film magnetic head. Here, the magnetic spacing is defined as a distance between the end of the head element of the thin-film magnetic head and the surface of the magnetic record layer of the magnetic recording medium.

One of the most effective methods for controlling the magnetic spacing is to adjust the pressure working between the thin-film magnetic head and the magnetic recording medium. For example, in a magnetic disk apparatus, the thin-film magnetic head flies above the rotating magnetic disk, and thus receives a certain negative pressure (a pressure by which the head and the medium are attracted to each other) generated by laminar air flow passing through between the head and the magnetic disk. Then, the negative pressure is balanced with an adjusted pressure which is brought to the head by the suspension that supports the head, to maintain a predetermined magnetic spacing.

As a measure for positively controlling the magnetic spacing by adjusting the pressure working between the thin-film magnetic head and the magnetic recording medium, for example, US Patent Publication No. 2003/0174430A1 describes a technique in which the head end surface is protruded toward the magnetic disk by heat generated from a heater provided within the thin-film magnetic head for magnetic disk apparatuses. Further, Japanese Patent Publication No. 2001-6143A describes a thin-film magnetic head in which a rail pattern having two steps is formed on an air bearing surface (ABS) to improve the accuracy in flying height.

Also in the thin-film magnetic head for a magnetic tape apparatus (tape head), it is an extremely effective method for appropriately controlling the magnetic spacing to adjust the pressure working between the tape head and magnetic tape. Here, the tape head and the magnetic tape as a magnetic recording medium are usually contacted with each other by receiving a certain suppress force that causes them to attract each other. Therefore, it is important for controlling the magnetic spacing to adjust the suppress force. As an example of intending to adjust the suppress force, Japanese Patent Publication No. 2004-295951A discloses a technique of utilizing a negative-pressure slider. Further, in the tape heads, it is significantly important to ensure a stable contact between the tape head and a running magnetic tape as a magnetic recording medium. As an approach for the stable contact, for example, U.S. Pat. No. 6,122,147 (Japanese Patent Publication No. 2000-207800A) discloses a technique in which cavities are provided in the medium-opposed surface of the tape head, and the cavities deform a portion of the magnetic tape passing by the cavities, to stably contact the tape head with the magnetic tape.

However, there has been a problem that the magnetic spacing is likely to vary due to the change in pressure working between the thin-film magnetic head and the magnetic recording medium. The change in pressure can be derived from the change in shape of the medium-opposed surface of the head, which is generated by the contact between the head and the medium, or from the burning and depositing of wear debris generated by the contact.

Especially, the tape head slides on the magnetic tape during read and write operations. Therefore, the shape of the tape bearing surface (TBS), which is a medium-opposed surface as well as a sliding surface, varies over time due to the friction with the magnetic tape. The variation of the shape becomes more drastic in the case that the magnetic tape contains abrasive. As the case may be, the lifetime of the tape head would be reduced by excessively decreasing the magnetic spacing due to the wear of the head generated from the increase in the degree of contact between the head and the magnetic tape. Further, in some cases, the head performance may be degraded due to frictional heat generated by the contact.

Furthermore, in some cases, the magnetic spacing may become larger due to the change in shape of the TBS or due to the burning and depositing of the wear debris described above, which would cause the read output to be decreased, or cause the peak steepness of the read signal to be degraded. Even in the tape head described in the above-described U.S. Pat. No. 6,122,147, constant is the negative pressure in the cavity by which the magnetic tape is attracted. Therefore, the tape head cannot control the magnetic spacing in response to the changing conditions.

Therefore, in the tape head, it is significantly important to appropriately control the magnetic spacing by dynamically and accordingly adjusting the pressure working between the head and the magnetic recording medium, according to the change of conditions such as the change over time. This adjustment of the pressure also becomes significantly important for other thin-film magnetic heads such as a thin-film magnetic head for magnetic disk.

SUMMARY OF THE INVENTION

Therefore, an object of the present invention is to provide a thin-film magnetic head in which the magnetic spacing can be appropriately controlled, by dynamically and accordingly adjusting the pressure working between the thin-film magnetic head and the magnetic recording medium according to the change of conditions such as the change over time, and to provide a magnetic tape apparatus provided with the just-described thin-film magnetic head.

Another object of the present invention is to provide a method for appropriately controlling the magnetic spacing by dynamically and accordingly adjusting the pressure working between the thin-film magnetic head and the magnetic recording medium, according to the change of conditions such as the change over time.

Before describing the present invention, terms used herein will be defined. In a multilayer structure of element(s) formed on/above an element formation surface of the substrate in a thin-film magnetic head, a layer located on the substrate side in relation to a standard layer is referred to as being located "lower" than, "beneath" or "below" the standard layer, and a portion on the substrate side of a layer is referred to as a "lower" portion. Further, a layer located on the stacking direction side (the opposite side to the substrate) in relation to a standard layer is referred to as being located "upper" than, "on" or "above" the standard layer, and a portion on the stacking direction side of a layer is referred to as an "upper" portion.

Further, in some figures showing embodiments of the tape head according to the present invention, "X-axis direction", "Y-axis direction" and "Z-axis direction" are defined, according to need. Here, X-axis direction corresponds to the above-described "upper and lower" direction, and Y-axis direction corresponds to the track width direction. Further, Z-axis direction is defined as height direction.

According to the present invention, a thin-film magnetic head for reading data from a magnetic recording medium and/or writing data to a magnetic recording medium is provided, which comprises at least one cavity for adjusting a pressure working between the thin-film magnetic head and the magnetic recording medium, provided in a surface of the head opposed to the magnetic recording medium, and a volume of the at least one cavity being variable.

In the above-described thin-film magnetic head, when the magnetic recording medium passes through near the cavity, the cavity generates a (negative) pressure that attracts the head and the medium toward each other. The amount of the negative pressure depends on the volume of the cavity; thus, a magnetic spacing $d_{MS}$ can be controlled dynamically and accordingly by adjusting the volume.

In the thin-film magnetic head according to the present invention, the thin-film magnetic head preferably further comprises: at least one magnetic head element for reading and/or writing data, formed on/above an element formation surface of a substrate; an overcoat layer formed on the element formation surface so as to cover the at least one magnetic head element; and a closure bonded on at least a portion of an upper surface of the overcoat layer. Further, the at least one cavity is preferably provided in a sliding surface of the head, the sliding surface being to slide on the magnetic recording medium.

In the thin-film magnetic head provided with the closure, the thin-film magnetic head preferably further comprises at least one volume-adjusting means for adjusting the volume of the at least one cavity. In the case, at least one volume-adjusting means is also preferably at least one heating element. The heat generated from the heating element causes a portion near the cavity to be thermally expanded; then, the inner wall of the cavity moves inward. Thus, controlling the amount of heat generated from the heating element enables the volume of the cavity to be adjusted.

Further in the case that the volume-adjusting means is the heating element, preferably further provided is at least one thermal expansion portion formed of a material with a coefficient of linear expansion larger than coefficients of linear expansion of the overcoat layer and the closure, positioned adjacent to the at least one cavity. By providing the thermal expansion portion, a desired change in volume of the cavity can be obtained with use of the less amount of heat generated from the heating element. Further, the less amount of heat facilitates suppressing the change in shape of the sliding surface due to the heat generated from the heating element. As a result, improved is the flexibility in the design of the setting place of the heating element in relation to the sliding surface.

Further in the case that the volume-adjusting means is the heating element, and the thermal expansion portion is provided, the at least one thermal expansion portion is preferably provided between the at least one cavity and the at least one volume-adjusting means. And it is also preferable the at least one volume-adjusting means is provided adjacent to the at least one cavity, on a substrate side or the opposite side in relation to the at least one cavity. Alternatively, it is preferable that the at least one thermal expansion portion is provided adjacent to the at least one cavity, on a side opposite to the sliding surface in relation to the at least one cavity; and the at least one volume-adjusting means is provided at the back of the at least one thermal expansion portion when viewed from the sliding surface side. Further alternatively, it is preferable that the at least one thermal expansion portion is provided adjacent to the at least one cavity, on a side opposite to the sliding surface in relation to the at least one cavity; and the at least one volume-adjusting means is provided adjacent to the at least one thermal expansion portion, on a substrate side or the opposite side in relation to the at least one thermal expansion portion.

Further, in the above-described thin-film magnetic head provided with the closure, the at least one volume-adjusting means is also preferably at least one piezoelectric element. And the at least one cavity is preferably provided, fronting on a boundary between the overcoat layer and the closure.

Further, as one embodiment of the thin-film magnetic head according to the present invention, a thin-film magnetic head is provided, which comprises:

at least one magnetic head element for reading and/or writing data, formed on/above an element formation surface of a substrate;

an overcoat layer formed on the element formation surface so as to cover the at least one magnetic head element;

a closure bonded on at least a portion of an upper surface of the overcoat layer;

an additional overcoat layer formed on a surface opposite to the element formation surface of the substrate;

an additional closure bonded on at least a portion of an upper surface of the additional overcoat layer;

at least one cavity provided in a surface opposed to the magnetic recording medium, fronting on a boundary between the overcoat layer and the closure;

at least one volume-adjusting means for adjusting a volume of the at least one cavity, provided within the overcoat layer;

at least one additional cavity provided in the surface opposed to the magnetic recording medium, fronting on a boundary between the additional overcoat layer and the additional closure; and at least one additional volume-adjusting means for adjusting a volume of the at least one additional cavity, provided within the additional overcoat layer.

According to the present invention, a magnetic tape apparatus is further provided, which comprises: at least one thin-film magnetic head described above; a control circuit for controlling read and/or write operation performed by the at least one thin-film magnetic head; and a volume control circuit for controlling operations of the at least one volume-adjusting means.

According to the present invention, a controlling method of a magnetic spacing is further provided, which comprises the step of adjusting a pressure working between a thin-film magnetic head and a magnetic recording medium by adjusting a volume of at least one cavity provided in a surface of the thin-film magnetic head, the surface being opposed to the magnetic recording medium. In the controlling method, by adjusting the volume of the at least one cavity, the pressure working between the thin-film magnetic head and the magnetic recording medium can be adjusted dynamically and accordingly, according to the change of conditions such as the change over time. As a result, the magnetic spacing can be controlled appropriately.

In the controlling method according to the present invention, at least one heating element is preferably used for adjusting the volume of the at least one cavity, or at least one piezoelectric element is also preferably used for adjusting the volume of the at least one cavity.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIGS. 4a1 to 4h show cross-sectional views schematically illustrating other embodiments of the thin-film magnetic head according to the present invention;

FIG. 7 shows a block diagram schematically illustrating a configuration of the recording/reproducing and cavity-volume control circuit provided in the magnetic tape apparatus according to the present invention.

DESCRIPTION OF THE PREFERRED EMBODIMENTS

Figure 1A:
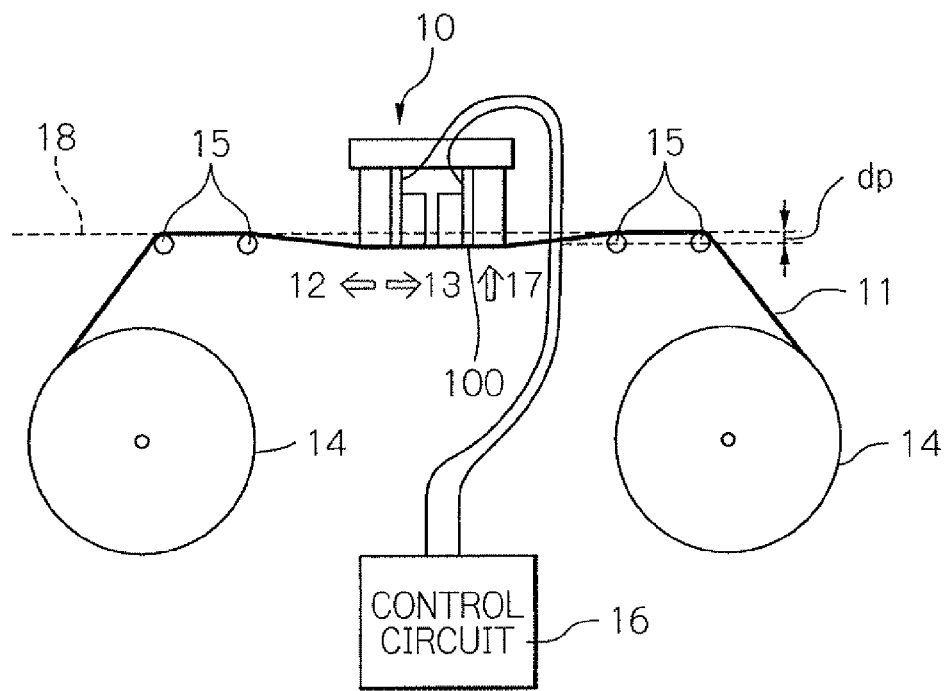
FIG. 1a shows a schematic view illustrating the main part of one embodiment of the magnetic tape apparatus according to the present invention.
Figure 1B:
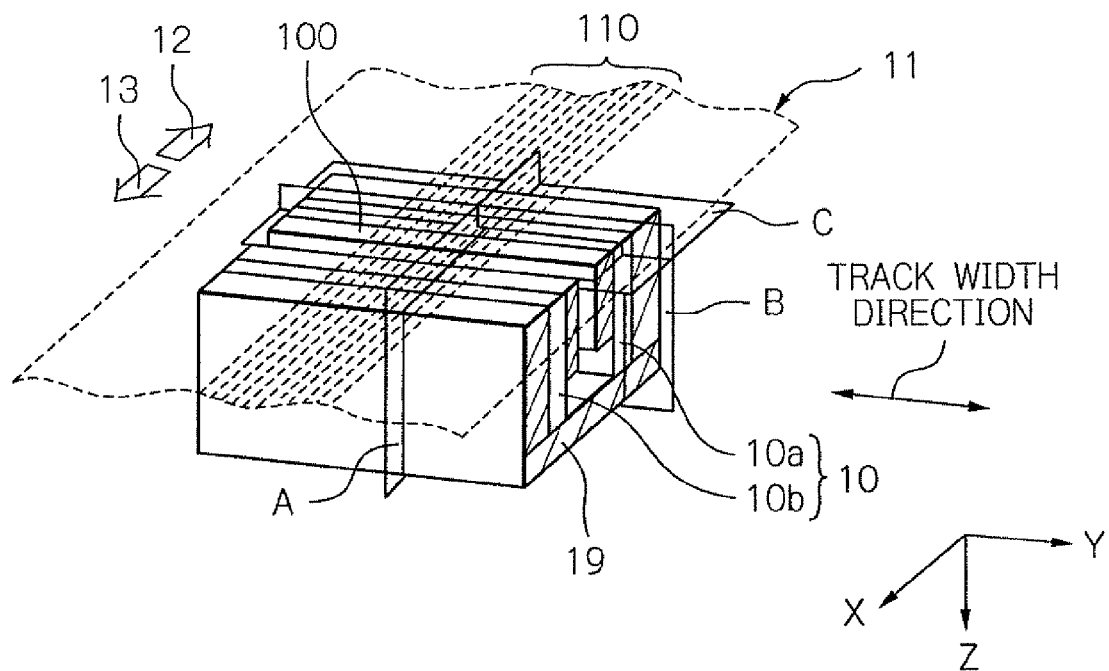
FIG. 1b shows a perspective view schematically illustrating one mode of the configuration of the magnetic recording medium and the thin-film magnetic head according to the present invention.

FIG. 1a shows a schematic view illustrating the main part of one embodiment of the magnetic tape apparatus according to the present invention. And FIG. 1b shows a perspective view schematically illustrating one mode of the configuration of the magnetic recording medium and the thin-film magnetic head according to the present invention.

As shown in FIG. 1a, the magnetic tape apparatus of the present embodiment includes: a tape head 10 as a thin-film magnetic head for performing read and write operations to a magnetic tape 11 as a magnetic recording medium; guide pins 15 for guiding the running of the magnetic tape 11; and a recording/reproducing and cavity-volume control circuit 16. The reference numeral 14 indicates reels for winding and unwinding (feeding) the magnetic tape 11.

The tape head 10 is provided for reading and writing data signals, whose tape baring surface (TBS) 100, which is the end surface on the magnetic tape 11 side or a medium-opposed surface (opposed-to-medium surface), is contacted with the magnetic tape 11 running in the direction of arrow 12 or 13. That is, the TBS 100 of the tape head 10 acts as a sliding surface.

The tape head 10 and the guide pins 15 are positioned so that a predetermined suppress force 17 works to cause the tape head 10 and magnetic tape 11 to be attracted toward each other. The suppress force 17 can be adjusted by the distance (penetration) $d_P$ by which the tape head 10 is held down from the common tangent line 18 drawn on the tape-contact sides of the guide pins 15. As described in detail later, the tape head 10 includes cavities (hollows) and a volume-adjusting means for adjusting the volume of the cavities, which enable the whole pressure working between the tape head 10 and the magnetic tape 11, including the suppress force 17, to be adjusted.

The recording/reproducing and cavity-volume control circuit 16 is provided for controlling the read and/or write operations of the tape head 10, and further controlling operations of the above-described volume-adjusting means.

As shown in FIG. 1b, the magnetic tape 11 has a plurality of tracks 110. The tape head 10 includes the first head part 10a and the second head part 10b, and a frame 19 that supports both of the head parts. During read and write operations, the magnetic tape 11 runs in the direction of the arrow 12 or 13. The tape head 10 performs data-reading and data-writing operations to the tracks 110 of the magnetic tape 11, the TBS 100 of the head 10 being contacted with the running tape 11. In the case that the magnetic tape runs in the direction of arrow 12, for example, the first head part 10a on the trailing side may read and the second head part 10b on the leading side may write. Whereas, in the case of the tape run in the direction of arrow 13, the head parts may be counterchanged with respect to their read and write operations. As a matter of course, a configuration in which the tape head 10 includes either of the first head part 10a or the second head part 10b is also within the scope of the present invention.

Figure 2:
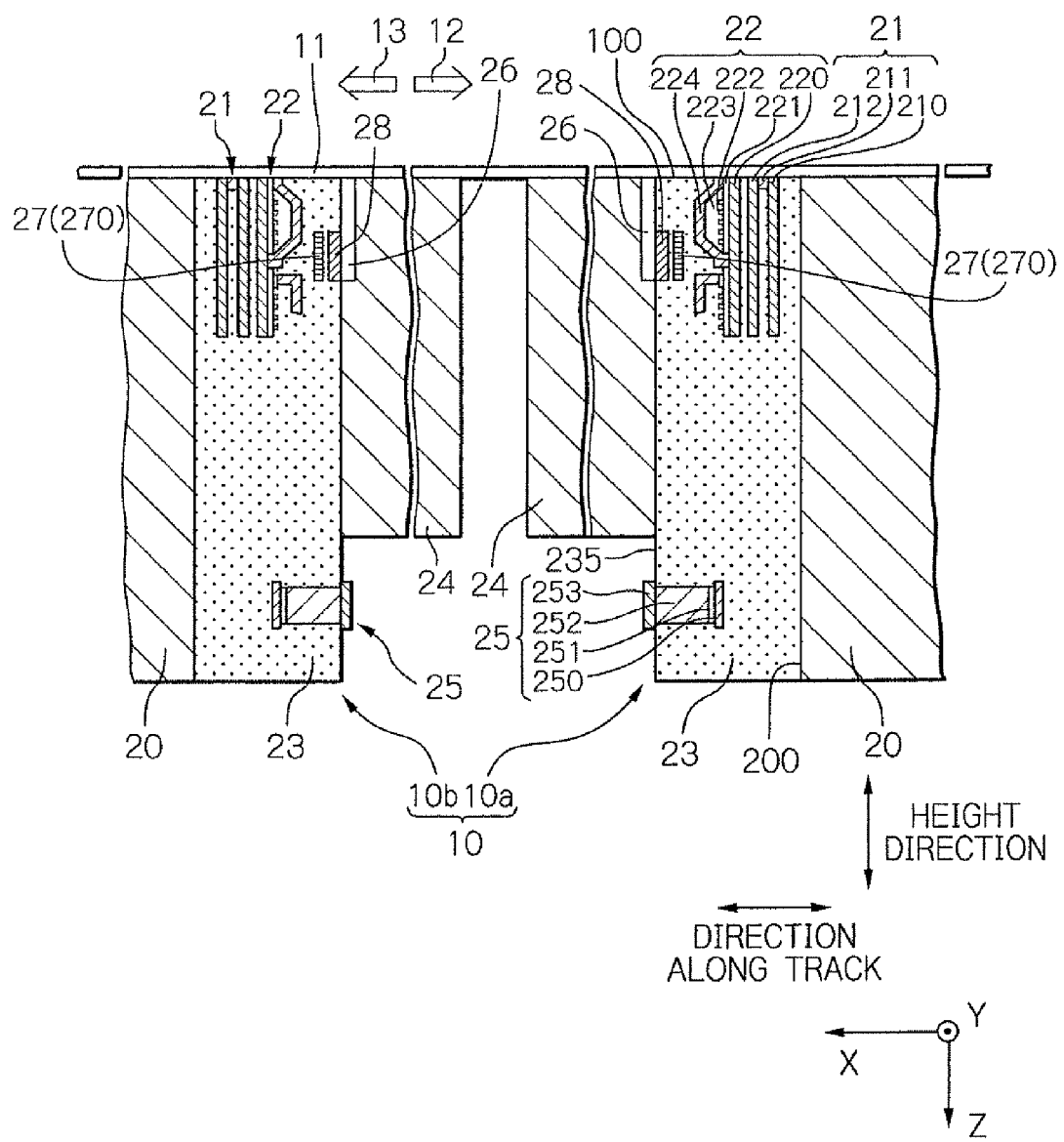
FIG. 2 shows a cross-sectional view taken along plane A shown in FIG. 1b, illustrating the main portion of one embodiment of the thin-film magnetic head according to the present invention.

FIG. 2 shows a cross-sectional view taken along plane A shown in FIG. 1b, illustrating the main portion of one embodiment of the thin-film magnetic head according to the present invention. In FIG. 2, a terminal electrode 25 may not practically appear on the cross-section taken along the plane A, however, is presented on the cross-section for convenience of explanation. Further, the first and second head parts 10a and 10b of the tape head 10 are opposed with each other in the direction along track, and have the common structure corresponding to each other. Therefore, only the first head part 10a will be explained below.

As shown in FIG. 2, the first head part 10a of the tape head 10 includes: a head substrate 20 made of, for example, AlTiC ($Al_2O_3$—TiC), having an element formation surface 200 perpendicular to the TBS 100; magnetoresistive (MR) elements 21 as read head elements for reading data signals, formed on/above the element formation surface 200; electromagnetic transducers 22 as write head elements for writing data signals, formed directly above the MR elements 21; an overcoat layer 23 formed on the element formation surface 200 so as to cover the MR elements 21 and electromagnetic transducers 22; a closure 24 made of, for example, AlTiC ($Al_2O_3$—TiC), adhered to a portion of the upper surface 235 of the overcoat layer 23, the other portion of the upper surface 235 being exposed; a cavity 26 provided in the TBS 100 for adjusting the pressure working between the tape head 10 and the magnetic tape 11, the opening of the cavity 26 being positioned on the TBS 100; an heating element 27 as a volume-adjusting means for adjusting the volume of the cavity 26; a thermal expansion portion 28 provided between the cavity 26 and the heating element 27; and a plurality of terminal electrodes 25 formed in the exposed portion of the upper surface 235 of the overcoat layer 23.

Figure 3A:
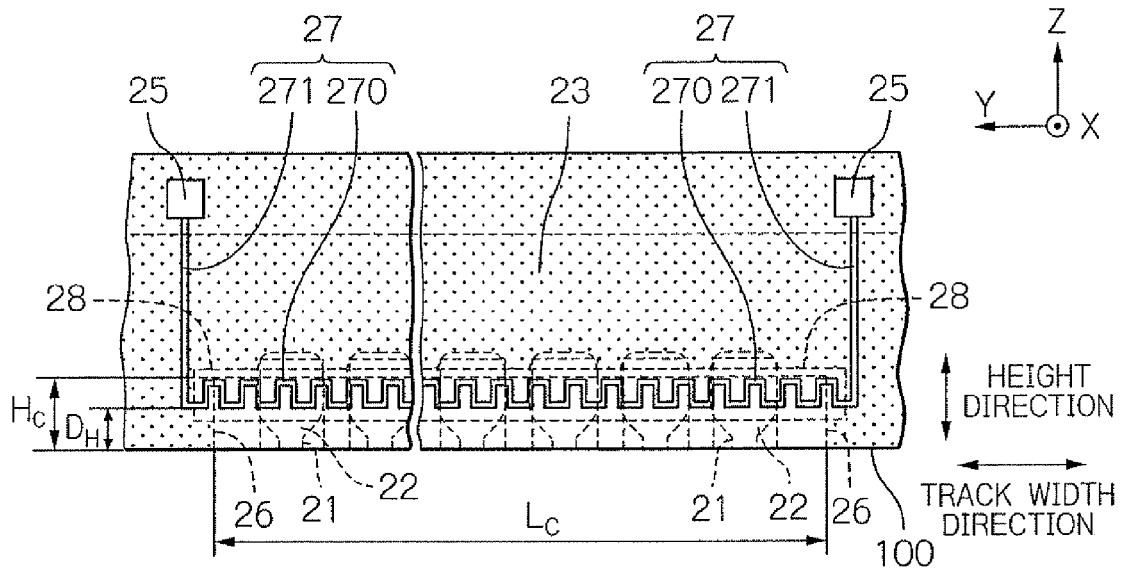
FIG. 3a shows a cross-sectional view taken by plane B shown in FIG. 1b, schematically illustrating the main portion of one embodiment of the thin-film magnetic head according to the present invention.
Figure 3B:
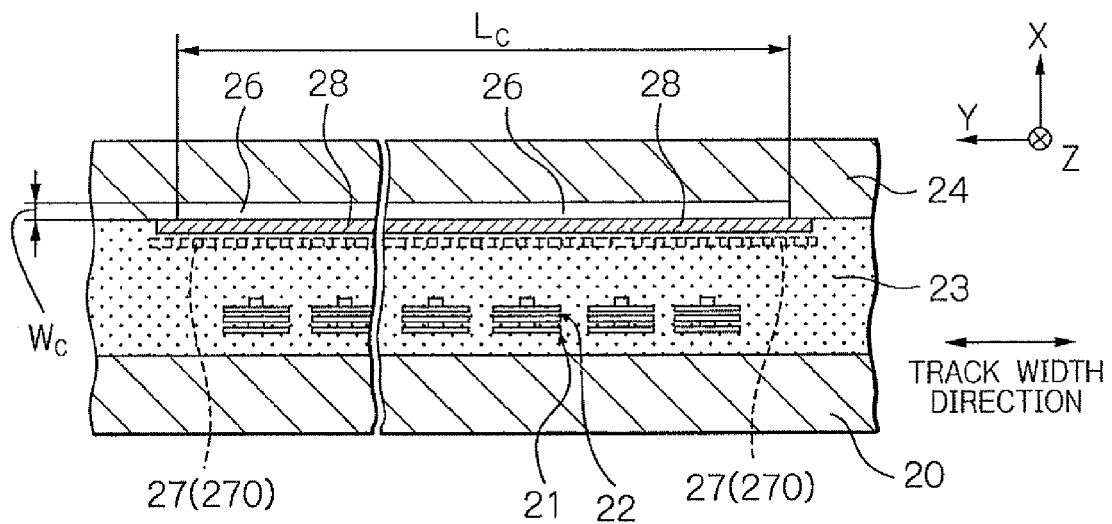
FIG. 3b shows a cross-sectional view taken by plane C shown in FIG. 1b, schematically illustrating the main portion of one embodiment of the thin-film magnetic head according to the present invention.

In the present embodiment, provided in the element formation surface 200 are a plurality of MR elements 21 and a plurality of electromagnetic transducers 22, both of which are aligned in the track width direction (Y-axis direction) corresponding to a plurality of tracks 110 (FIGS. 3a and 3b). However, in FIG. 2, only one of the MR elements 21 and one of magnetic transducers 22 are presented on the cross-section taken along the plane A.

The MR elements 21 and electromagnetic transducers 22 are electrically connected to their respective terminal electrodes 25. One ends of the MR elements 21 and electromagnetic transducers 22 reach the TBS 100 and contact with the magnetic tape 11. In the just-described configuration, during read and write operations, each of the electromagnetic transducers 22 writes data signals by applying signal magnetic fields to the corresponding track of the running magnetic tape 10, and each of the MR elements 21 reads data signals by sensing signal magnetic fields from the corresponding track of the running magnetic tape 10.

As shown in FIG. 2, each of the MR elements 21 includes: an MR multilayer 211; and a lower shield layer 210 and an upper shield layer 212, disposed so as to sandwich the MR multilayer therebetween. The upper and lower shield layers 212 and 210 act for preventing the MR multilayer 211 from receiving external magnetic fields as a noise. Each of the upper and lower shield layers 212 and 210 is formed of a soft-magnetic material such as FeSiAl (Sendust), NiFe (Permalloy), CoFeNi, CoFe, FeN, FeZrN or CoZrTaCr, or a multilayer of these materials, for example, with thickness of approximately 0.5 to 3 μm (micrometers) made by using, for example, a frame plating method or a sputtering method.

The MR multilayer 211 is a magneto-sensitive portion for sensing signal magnetic fields by utilizing an MR effect, and may be, for example, an anisotropic magnetoresistive (AMR) multilayer that utilizes an AMR effect, a giant magnetoresistive (GMR) multilayer that utilizes a GMR effect, or a tunnel magnetoresistive (TMR) multilayer that utilizes a TMR effect. Further, in the case of the GMR multilayer, the MR multilayer 211 may be a current-in-plane giant magnetoresistive (CIP-GMR) multilayer, or a current-perpendicular-to-plane giant magnetoresistive (CPP-GMR) multilayer. Any MR multilayer 211 utilizing one of these MR effects senses signal magnetic fields from the track 110 of the magnetic tape 11 with high sensitivity. In the case that the MR multilayer 211 is a CPP-GMR multilayer or a TMR multilayer, the upper and lower shield layers 212 and 210 also act as electrodes. Whereas, in the case that the MR multilayer 211 is an AMR multilayer or a CIP-GMR multilayer, insulating layers are provided between the MR multilayer 211 and respective upper and lower shield layers 212 and 210, and further, provided are MR lead layers connected electrically with the MR multilayer 211.

As shown in FIG. 2, each of the electromagnetic transducers 22 includes: a lower magnetic pole layer 220; an upper magnetic pole layer 224; a write gap layer 221, the end portion on the TBS 100 side of the write gap layer 221 being sandwiched between the lower magnetic pole layer 220 and the upper magnetic pole layer 224; a write coil layer 222 formed so as to pass through in every turn at least between the upper and lower magnetic pole layers 224 and 220; and a coil insulating layer 223 for isolating the write coil layer 222 from the upper and lower magnetic pole layers 224 and 220.

The lower magnetic pole layer 220 and the upper magnetic pole layer 224 act as a path of the magnetic flux excited by write current flowing through the write coil layer 222. And one end portions of the upper and lower magnetic pole layers 224 and 220 sandwich the end portion on the TBS 100 side of the write gap layer 221. The leakage magnetic field from the sandwiched end portion of the write gap layer 221 is used for writing. In FIG. 2, the write coil layer 222 has a monolayer structure, however, may have a two or more layered structure or a helical coil shape. Further, in the MR element 21 and the electromagnetic transducer 22 stacked on the MR element 21, the upper shield layer 212 and the lower magnetic pole layer 220 may be substituted with one magnetic layer.

The lower magnetic pole layer 220 is formed of a soft-magnetic material such as NiFe (Permalloy), CoFeNi, CoFe, FeN FeZrN or CoZrTaCr, or a multilayer of these materials, for example, with thickness of approximately 0.5 to 3 μm, made by using, for example, a frame plating method or a sputtering method. The write gap layer 221 is formed of a non-magnetic material such as $Al_2O_3$ (alumina), $SiO_2$ (silicon dioxide), AlN (aluminum nitride) or DLC (diamond-like carbon), for example, with thickness of approximately 0.01 to 0.05 μm, made by using, for example, a sputtering method or a chemical vapor deposition (CVD) method. The write coil layer 222 is formed of a conductive material such as Cu, for example, with thickness of approximately 0.5 to 5 μm, made by using, for example, a frame plating method or a sputtering method. The coil insulating layer 223 is formed of, for example, an insulating resin layer such as a heat-cured novolac-based photoresist or the like, for example, with thickness of approximately 0.7 to 7 μm, made by using, for example, a photolithography method. The upper magnetic pole layer 224 is formed of a soft-magnetic material such as NiFe (Permalloy), CoFeNi, CoFe, FeN FeZrN or CoZrTaCr, or a multilayer of these materials, for example, with thickness of approximately 0.5 to 3 μm, made by using, for example, a frame plating method or a sputtering method. The overcoat layer 23 is formed of, for example, stacked non-magnetic insulating materials such as $Al_2O_3$ (alumina), $SiO_2$ (silicon dioxide), AlN (aluminum nitride) or DLC, made by using, for example, a sputtering method or a CVD method.

The cavity 26 are provided for adjusting the whole pressure, which includes the suppress force, working between the tape head 10 and the magnetic tape 11. The opening of the cavity 26 is positioned on the TBS 100. In the present embodiment, the cavity 26 is a groove (FIGS. 3a and 3b) extending in the track width direction (Y-axis direction), which has a depth in height direction (Z-axis direction), fronting on the boundary between the overcoat layer 23 and the closure 24 and provided on the closure 24 side. The (inner) volume of the cavity 26 can be changed by using the heating element 27. As described in detail later by referring to FIGS. 5a to 5c, providing this variable-volume cavity 26 enables the magnetic spacing to be dynamically and accordingly controlled by adjusting the pressure working between the first head part 10a and the magnetic tape 11.

The heating element 27 is a volume-adjusting means for adjusting the volume of the cavity 26, provided below the cavity 26 (on the −X side of the cavity 26) in the present embodiment. As detailed later by referring to FIGS. 5a to 5c, the heat generated from the heating element 27 causes a portion near the cavity 26 to thermally expand; thus, the inner wall of the cavity 26 moves inward. Thereby, the cross-section of the cavity taken by a plane parallel to the TBS 100 decreases; thus the volume of the cavity 26 decreases. Here, controlling the amount of heat generated from the heating element 27 enables the volume of the cavity 26 to be adjusted. As a result, the pressure working between the tape head 10 (the first head part 10a) and the magnetic tape 11 can be adjusted dynamically and accordingly, according to the change of conditions such as the change over time. Consequently, the magnetic spacing can be stably and appropriately controlled, and the excessive wear of the head can be avoided. The heating element 27 may be provided in a position sufficiently distant from the TBS 100, in the case that it is required to avoid the protrusion of the ends on the TBS 100 side of the MR elements 21 and electromagnetic transducers 22. The protrusion, toward the magnetic tape 11, would occur by the change in shape of the TBS 100 due to the heat generated from the heating element 27.

The thermal expansion portion 28 is provided adjacent to the cavity 26, and between the cavity 26 and the heating portion 270 of the heating element 27 in the present embodiment. The thermal expansion portion 28 is formed of a material with a coefficient of linear expansion larger than those of the overcoat layer 23 and the closure 24. When the heating element 27 generates heat, the thermal expansion portion 28 thermally expands more than the surrounding. As a result, the inner wall of the cavity 26 moves by a larger amount; thus, the volume of the cavity 26 is changed more greatly. In this way, by providing the thermal expansion portion 28, improved is the efficiency in the control of the pressure between the tape head 10 and the magnetic tape 11 with use of the heat generated from the heating element 27. That is, a desired change in the volume of the cavity 26 can be obtained with less amount of heat generated from the heating element 27. Further, the less amount of heat in the heating element 27 facilitates suppressing the change in shape of the TBS 100 due to the heat generated from the heating element 27. As a result, improved is the flexibility in the design of the setting place of the heating element 27 in relation to the TBS 100.

Of course, in a configuration without the thermal expansion portion 28 positioned between the cavity 26 and the heating element 27, it is possible to change the volume of the cavity 26 by the heat generated from the heating element 27. Therefore, such a configuration can be within the scope of the present invention. Alternatively, the heating element 27 may be positioned above the cavity 26 (on the +X side of the cavity 26), and the thermal expansion portion 28 may be provided between them. Further, the cavity 26, the heating element 27 and the thermal expansion portion 28 are preferably provided in the second head part 10b as well as the first head part 10a. This configuration enables the pressure working between the second head part 10b and the magnetic tape 11 to be dynamically adjusted independently of the first head part 10a. Therefore, in either case that the magnetic tape 11 runs in the direction of arrow 12 or 13, each of the first and second head parts 10a and 10b can maintain an appropriate magnetic spacing under the proper pressure; thus, the favorable read and write operations can be performed.

The terminal electrode 25 includes a lead electrode 250, a base electrode film 251, a bump 252 and a pad 253. The lead electrode 250 is electrically coupled with a lead line extending from the MR element 21, the electromagnetic transducer 22 or the heating element 27. On the lead electrode 250, formed is the base electrode film 251 with conductivity, and the bump 252 is formed by using a plating method with the base electrode film 251 as an electrode. The base electrode film 251 and the bump 252 are formed of a conductive material such as Cu. The base electrode film 251 has a thickness of, for example, approximately 10 to 200 nm (nanometers), and the bump 252 has a thickness of, for example, approximately 5 to 30 μm. The top end of the bump 252 is exposed in the upper surface 235 of the overcoat layer 23. On the top end of the bump, formed is the pad 253.

FIG. 3a shows a cross-sectional view taken by plane B shown in FIG. 1b, schematically illustrating the main portion of one embodiment of the thin-film magnetic head according to the present invention. In FIG. 3a, the heating element 27 appears on the cross-section, and the MR elements 21, the electromagnetic transducers 22, the cavity 26 and the thermal expansion portion 28 are presented by dashed lines. FIG. 3b shows a cross-sectional view taken by plane C shown in FIG. 1b, schematically illustrating the main portion of one embodiment of the thin-film magnetic head according to the present invention. In the cross-section of FIG. 3b, the heating element 27 is presented by dashed lines.

As shown in FIGS. 3a and 3b, the MR elements 21 and the electromagnetic transducers 22 are aligned in the track width direction (Y-axis direction) respectively, one ends of which reach the TBS 100. The heating element 27 is a conductive path pattern extending in the track width direction (Y-axis direction) with a predetermined length, and has a heating portion 270 and lead portions 271. The heating portion 270 is a meander pattern of electric resistor material, located so that the end on the TBS 100 side is distant from the TBS 100 with a predetermined distance $D_H$. The distance $D_H$ is preferably set to be a value by which unwanted change in shape of TBS 100 derived from the heat from the heating element 27 can be avoided. The lead portion 271 is a conductive pattern electrically connecting the heating portions 270 and the terminal electrode 25. The heating element 27 generates heat by being supplied with electric power through the terminal electrodes 25 from the recording/reproducing and cavity-volume control circuit 16 (FIG. 1a). The surrounding of the cavity 26, which includes the thermal expansion portion 28 positioned above the heating portion 270 (on the +X side of the heating portion 270), is thermally expanded by the heat generated from the heating portion 270. As a result, the volume of the cavity 26 decreases. The volume can be adjusted by controlling the amount of electric power supplied to the heating element 27.

The shape of the heating portion 270 is not limited to the meander one, and may be, for example, one line, U-shaped or spiral. The heating portion 270 has a line width of, for example, approximately 1 to 100 μm and a thickness of, for example, approximately 0.01 to 5 μm; and is formed of a material mainly including, for example, NiCu, NiCr, Ta, W, Ti, Cu, Au, Al or NiFe. The lead portion 271 may be formed of a conductive material such as Cu or Au, or may be formed integrally with the heating portion 270 by using the same material as the portion 270.

Also as shown in FIGS. 3a and 3b, in the present embodiment, the cavity 26 is a groove with a rectangular parallelepiped shape, positioned above the heating element 27 (on the +X side of the heating element 27), the opening of the cavity 26 being on the TBS 100. The length $L_C$ in the track width direction (Y-axis direction) of the cavity 26 preferably covers the range in which all the MR elements 21 and magnetic transducers 22 are aligned in the track width direction, and is preferably more than twice as large as the width of the magnetic tape 11. For example, the length $L_C$ is in the range of approximately 0.1 to 60 mm (millimeters). The depth $H_C$ in height direction (Z-axis direction) of the cavity 26 is, for example, in the range of approximately 1 to 100 µm. Further, the width $W_C$ (FIG. 3b) of the cavity 26, in the direction along the track of the magnetic tape 11 (in X-axis direction), is, for example, in the range of approximately 0.1 µm to 10 mm. The volume of the cavity 26 is equivalent to length $L_C \times$ depth $H_C \times$ width $W_C$. The shape of the cross-section of the cavity 26, taken by a plane parallel to the TBS 100, is not limited to a quadrangular shape, and may be elliptical or trapezoidal.

As shown in FIG. 3b, the cavity 26 is provided on the closure 24 side, fronting on the boundary between the overcoat layer 23 and the closure 24. Specifically, the cavity 26 is a groove formed on the adhesion surface of the closure 24, the adhesion surface being to be adhered to the upper surface 235 of the overcoat layer 23. In this case, during the head manufacturing process, the groove is formed on the closure 24 in advance; then the closure 24 is adhered to the upper surface 235 of the overcoat layer 23; thus, the cavity 26 can be formed rather easily.

Also as shown in FIG. 3b, in the present embodiment, the thermal expansion portion 28 is a layer extending in the track width direction (Y-axis direction), provided between the cavity 26 and the heating element 27. A portion of the inner wall of the cavity 26 is a surface of the thermal expansion portion 28. Alternatively, a portion of the overcoat layer 23 or the closure 24, for example, may lie between the cavity 26 and the thermal expansion portion 28 or between the thermal expansion portion 28 and the heating element 27. By providing the above-described thermal expansion portion 28, improved is the efficiency in the control of the pressure between the head 10 and the magnetic tape 11 with use of the heat generated from the heating element 27; and further improved is the flexibility in the design of the setting place of the heating element 27 in relation to the TBS 100, as described above.

The thermal expansion portion 28 is formed of a material with a coefficient of linear expansion larger than those of the overcoat layer 23 and the closure 24. For example, in the case that the constituent material of the overcoat layer 23 is alumina ($Al_2O_3$, coefficient of linear expansion: $8 \times 10^{-6}$/K) and the constituent material of the closure is AlTiC ($Al_2O_3$—TiC coefficient of linear expansion: $7.5 \times 10^{-6}$/K), it is possible to use: as a constituent material for the thermal expansion portion 28, the Permalloy (NiFe, coefficient of linear expansion: $12 \times 10^{-6}$/K), a photoresist (coefficient of linear expansion: $90 \times 10^{-6}$/K), Cu (coefficient of linear expansion: $16.5 \times 10^{-6}$/K), or NiCu (coefficient of linear expansion: $15 \times 10^{-6}$/K), for example.

In the present embodiment, the thermal expansion portion 28 is provided mainly above the heating portion 270. Alternatively, one edge on the TBS 100 side of the thermal expansion portion 28 may extend to the vicinity of the TBS 100, or the thermal expansion portion may surround the cavity 26. Further, all or most of the inner wall of the cavity 26 may be a surface of the thermal expansion portion. These configurations enable the amount of change (increase) in volume of the cavity 26 per unit quantity of the heat generated from the heating element 27 to be larger.

FIGS. 4a1 to 4h show cross-sectional views schematically illustrating other embodiments of the thin-film magnetic head according to the present invention. The directions of the cross-sections in these figures can be identified by the directions of X-axis, Y-axis and Z-axis shown in the Figures. Further, FIGS. 4a2, 4b2, 4d2, 4e2 and 4f2 are views of cross-sections taken along D-D line in FIG. 4a1, E-E line in FIG. 4b1, F-F line in FIG. 4d1, G-G line in FIG. 4e1, and H-H line in FIG. 4f1, respectively.

In the embodiment shown in FIGS. 4a1 and 4a2, a cavity 30 is provided in the TBS 100, the opening of the cavity 30 being positioned on the TBS 100. And a thermal expansion portion 32 is provided adjacent to the cavity 30, on the side opposite to the TBS 100 in relation to the cavity 30 in height direction (Z-axis direction). Further, the heating portion 310 of a heating element 31 is provided at the back (on the +Z side) of the thermal expansion portion 32 when viewed from the TBS 100 side. The thermal expansion portion 32 is a layer extending in the track width direction (Y-axis direction), and the heating element 31, which includes the heating portion 310 and lead portions 311, is a conductive path pattern with a predetermined length, extending in the track width direction (Y-axis direction).

In the embodiment shown in FIGS. 4b1 and 4b2, the cavity 30 and the thermal expansion portion 32 are also provided as in the embodiment shown in FIGS. 4a1 and 4a2. However, the heating portion 310' of a heating element 31' is provided adjacent to the thermal expansion portion 32, and below the portion 32 (on the –X side of the portion 32). Alternatively, the heating portion 310' may be provided adjacent to the thermal expansion portion 32, and above the portion 32 (on the +X side of the portion 32). In each of these embodiments, the thermal expansion portion 32 is thermally expanded by the heat generated from the heating element 31 or 31'; thus, the bottom surface 300 of the cavity 30 is moved in the direction toward the TBS 100 (in the –Z direction). As a result, the volume of the cavity 30 is decreased due to the decrease in depth (length in Z-axis direction) of the cavity 30. Then, the volume of the cavity 30 can be adjusted by controlling the amount of heat generated from the heating element 31 or 31'.

In the embodiment shown in FIG. 4c, the cavity 26, the heating element 27 and the thermal expansion portion 28 are also provided as in the embodiment shown in FIG. 3b. However, the cavity 33, the heating element 34 and the thermal expansion portion 35 are further provided so as to sandwich the MR elements 21 and electromagnetic transducers 22 between the elements 26 to 28 and the elements 33 to 35. The cavity 33 is a groove extending in the track width direction (Y-axis direction) with a depth in height direction (Z-axis direction), fronting on the boundary between the head substrate 20 and the overcoat layer 23, and provided on the head substrate 20 side. The heating element 34 is provided adjacent to the cavity 33 and above the cavity 33 (on the +X side of the cavity 33). And the thermal expansion portion 35 is provided adjacent to the cavity 33 and between the cavity 33 and the heating element 34.

As described above, the embodiment in which: a plurality of sets of cavity, heating element and thermal expansion portion is disposed in the direction along track (X-axis direction); and a plurality of openings of the cavities is positioned on the TBS 100, can be within the scope of the present invention. Here, in the embodiment shown in FIG. 4c, by controlling each of the amounts of heat generated from the heating elements 27 and 34 independently, each of the volumes of the cavities 26 and 33 can be adjusted independently of each other. As a result, the distribution in the direction along track (X-axis direction) of the pressure working between the tape head and the magnetic tape can be controlled. And thus, the magnetic spacing at the positions of the ends of MR elements 21 and electromagnetic transducers 22 can be stably controlled, by balancing the pressure in the direction along track.

In the embodiment shown in FIGS. 4d1 and 4d2, a plurality of cavities 36 is aligned in the track width direction (Y-axis direction), the openings of the cavities 36 being positioned on the TBS 100. Further, the heating portion 370 of a heating element 37 is provided adjacent to each of the cavities 36 and below each of the cavities 36 (on the −X side of each of the cavities 36). As a result, a plurality of heating elements 37 is aligned in the track width direction (Y-axis direction). Further, a thermal expansion portion 38 is provided adjacent to each of the cavities 36 and between the cavity 36 and the heating portion 370. As a result, a plurality of thermal expansion portions 38 is also aligned in the track width direction (Y-axis direction).

As described above, the embodiment in which: a plurality of sets of cavity, heating element and thermal expansion portion is disposed in the track width direction (Y-axis direction); and a plurality of openings of the cavities is positioned on the TBS 100, can be within the scope of the present invention. Here, in the embodiment shown in FIGS. 4d1 and 4d2, by controlling each of the amounts of heat generated from the heating elements 38 independently, each of the volumes of the cavities 36 can be adjusted independently of one another. As a result, the distribution in the track width direction (Y-axis direction) of the pressure working between the tape head and the magnetic tape can be controlled. And thus, the distribution in the track width direction (Y-axis direction) of magnetic spacing at the positions of the ends of MR elements 21 and electromagnetic transducers 22 can be stably controlled, by balancing the pressure in the track width direction.

In the embodiment shown in FIGS. 4e1 and 4e2, a plurality of cavities 39 is aligned in the track width direction (Y-axis direction), the openings of the cavities 39 being positioned on the TBS 100. Further, a thermal expansion portion 41 is provided adjacent to each of the cavities 39 and on the side opposite to the TBS 100 in relation to each of the cavities 39 in height direction (Z-axis direction). And the heating portion 400 of a heating element 40 is provided at the back (on the +Z side) of the thermal expansion portion 41 when viewed from the TBS 100 side. As a result, a plurality of thermal expansion portions 41 and a plurality of heating elements 40 are aligned in the track width direction (Y-axis direction), respectively.

In the embodiment shown in FIGS. 4f1 and 4f2, a plurality of cavities 39 and a plurality of thermal expansion portions 41 are also provided as in the embodiment shown in FIGS. 4e1 and 4e2. However, the heating portion 400' of a heating element 40' is provided adjacent to each of the thermal expansion portion 41, and below the portion 41 (on the −X side of the portion 41). In the embodiments shown in FIGS. 4e1 and 4e2 and FIGS. 4f1 and 4f2, by controlling each of the amounts of heat generated from the heating elements 40 or 40' independently, each of the volumes of the cavities 39 can be adjusted independently of one another. As a result, the distribution in the track width direction (Y-axis direction) of the pressure working between the tape head and the magnetic tape can be controlled. And thus, the distribution in the track width direction (Y-axis direction) of magnetic spacing at the positions of the ends of MR elements 21 and electromagnetic transducers 22 can be stably controlled, by balancing the pressure in the track width direction.

Figure 4G:
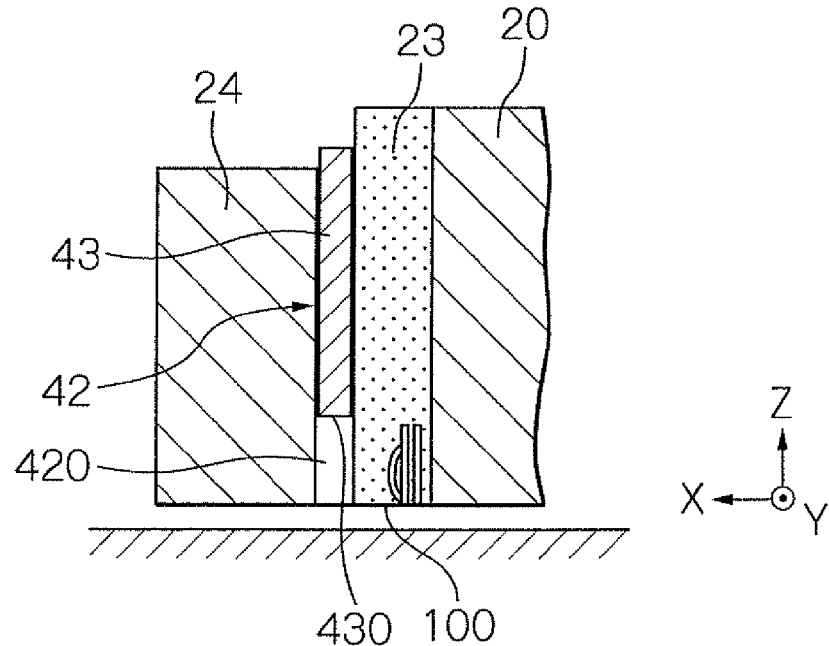

In the embodiment shown in FIG. 4g, provided is a through hole (groove) 42 which penetrates between the TBS 100 and the opposite end surface, in the boundary between the overcoat layer 23 and the closure 24. And a piezoelectric element 43 as a volume-adjusting means for cavity is inserted from the side opposite to the TBS 100 of the through hole 42. As a result, formed is a cavity 420 with an opening on the TBS 100, the bottom surface of the cavity 420 being the end surface 430 of the piezoelectric element 43. The piezoelectric element 43 is formed of, for example, a ferroelectric material such as lead zirconium titanate (PZT) with (inverse) piezoelectric effect, and is deformed by applying a voltage between the end surfaces opposed to each other. The application of voltage in the piezoelectric element 43 enables the end surface 430 to be moved in the order of, for example, a micrometer (μm) or higher. Thus, the depth (length in Z-axis direction) of the cavity 420 increases/decreases; that is, the volume of the cavity 420 is changed. This volume of the cavity 420 can be adjusted by controlling the voltage applied to the piezoelectric element 43.

Alternatively, instead of inserting the piezoelectric element into the formed through hole, a piezoelectric layer made of a ferroelectric material such as PZT and provided with electrodes may be stacked at the back (on the +Z side) of the cavity 430 when viewed from the TBS 100 side, to form the piezoelectric element 43.

Figure 4H:
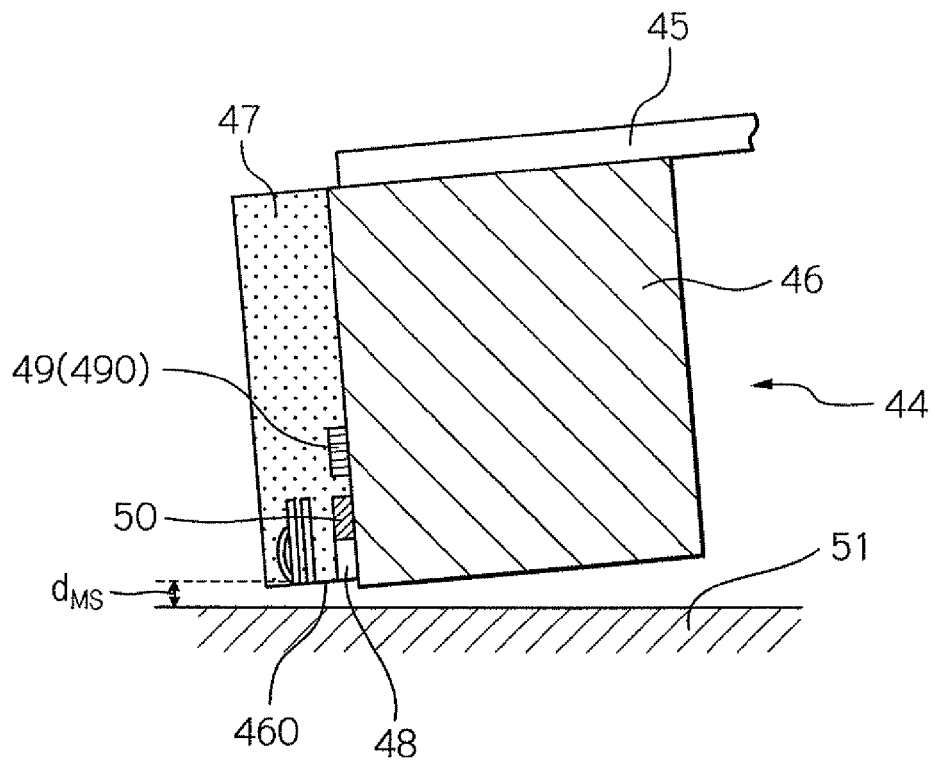

According to the embodiment shown in FIG. 4h, in a thin-film magnetic head 44 used for magnetic disk apparatuses, provided are: a cavity 48 with an opening on the air bearing surface (ABS) 460; a heating element 49 positioned near the cavity 48; and a thermal expansion portion 50 provided between the cavity 48 and the heating portion 490 of the heating element 49. The thin-film magnetic head 46 receives a certain negative pressure derived from a laminar air flow taking place between the head 46 and the rotated magnetic disk 51. The thin-film magnetic head 46 keeps the magnetic spacing $d_{MS}$ at a predetermined value during flying, by balancing the negative pressure and the supporting force of a suspension 45. However, the magnetic spacing $d_{MS}$ is varied by the change in shape of the ABS 460 due to the contact between the head 46 and the magnetic disk 51, or by the change of environment. As a countermeasure to this variation, the volume of the cavity 48 is adjusted by controlling the amount of heat generated from the heating element 49. Thereby, the magnetic spacing $d_{MS}$ can be dynamically and accordingly controlled according to the change of conditions such as the change over time.

In each of the above-described embodiments shown in FIGS. 4a1 to 4h, even in an alternative case without the thermal expansion portion, the volume of the cavity can be adjusted by controlling the amount of heat generated from the heating element, or by controlling the voltage applied to the piezoelectric element. Therefore, these alternatives can be within the scope of the present invention. Further, each of the cavity, the heating element and the thermal expansion portion may be provided at the position other than those described above, within the overcoat layer, within the closure or within the head substrate.

Figure 5A:
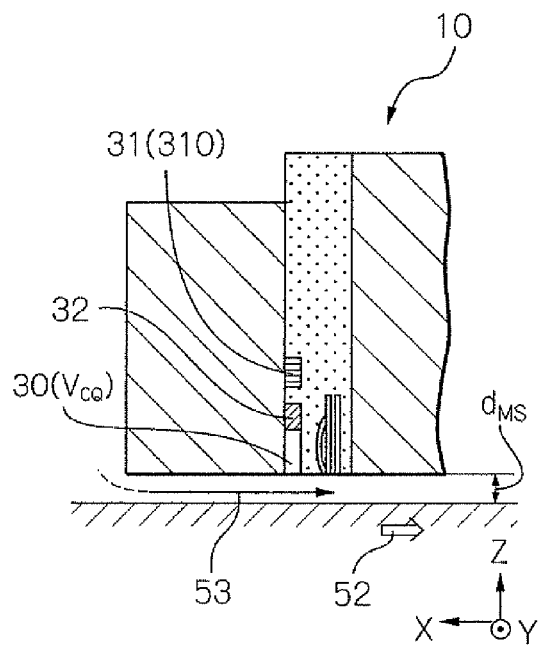
FIGS. 5a to 5b show cross-sectional views explaining the principle for controlling the magnetic spacing by adjusting the pressure working between the head and the medium with use of the cavity and heating element according to the present invention.
Figure 5B:
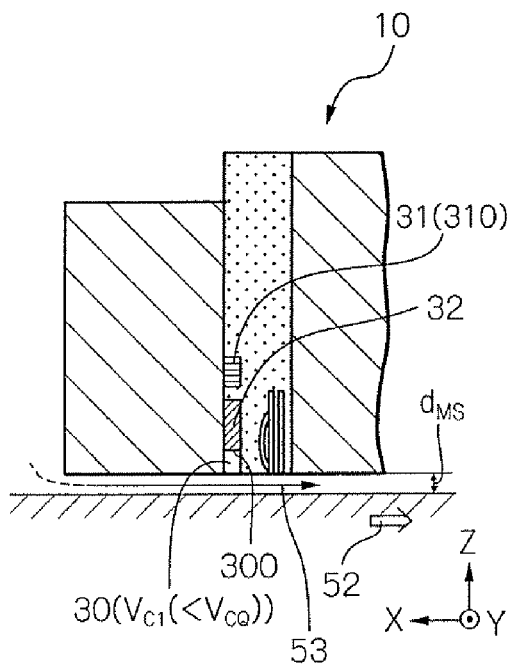
Figure 5C:
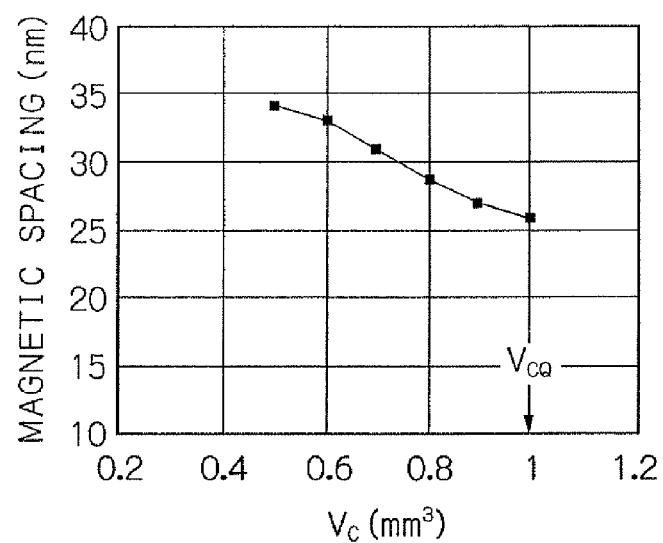

FIGS. 5a to 5b show cross-sectional views explaining the principle for controlling the magnetic spacing by adjusting the pressure working between the head and the medium with use of the cavity and heating element according to the present invention. And FIG. 5c shows a graph illustrating the relation between the volume of the cavity and the magnetic spacing $d_{MS}$. The data indicated on the graph was obtained by a simulation experiment. FIGS. 5a and 5b show a head of the embodiment shown in FIGS. 4a1 and 4a2, which includes the cavity 30, the heating element 31 and the thermal expansion portion 32. And the result of the simulation calculation shown in FIG. 5c was obtained for this head. In the simulation experiment, the volume $V_C$ of the cavity which had not been adjusted yet by using the heating element 31 was about 25 mm×about 20 µm×about 2.0 mm (length $L_C$×depth $H_C$×width $W_C$). Due to the heat generated from the heating element 31, mainly the depth $H_C$ decreased approximately by half. The running speed of the magnetic tape was approximately 4.0 m/s.

First, FIG. 5a shows the case of the tape head 10 according to the present invention, in which the heating element 31 is not powered and the cavity 30 has its original volume $V_{C0}$. In the case, when the magnetic tape 11 runs in the direction of arrow 52, a high-speed laminar air flow 53 is generated due to dragging of the air by the running magnetic tape 11, between the TBS 100 of the tape head 10 and the surface of the magnetic tape 11. As a result, a space comes into being therebetween. The space becomes very small due to the low pressure derived correspondingly from the high-speed laminar air flow 53 based on Bernoulli's theorem. The reason why the suppress force is applied between the tape head 10 and the magnetic tape 11 is to contact the tape head 10 with the magnetic tape 11 by pressing this very small space.

Further, when the magnetic tape 11 passes through near the cavity 30, the pressure between the cavity 30 and the magnetic tape 11 becomes lower compared to the surrounding. That is, the cavity 30 generates a pressure that attracts the tape head 10 and magnetic tape 11 toward each other (a negative pressure), under the existence of the laminar air flow 53. Under the condition of a constant running speed, the amount of the negative pressure becomes smaller as the volume $V_C$ becomes smaller in a certain volume range. As a result, as shown in the simulation result of FIG. 5c, the magnetic spacing $d_{MS}$ becomes larger as the volume $V_C$ becomes smaller. In this way, the magnetic spacing $d_{MS}$ can be controlled by adjusting the volume $V_C$. In first place, the original volume $V_{C0}$ of the cavity 30 is set to be larger than the volume $V_{C1}$ with which a desired magnetic spacing $d_{MS}$ can be obtained. Meanwhile, making the running speed of the magnetic tape 11 smaller also provides the function of the negative pressure, which can contribute to the control of the magnetic spacing $d_{MS}$. Here, the magnetic spacing $d_{MS}$ is defined as a distance between: the ends of MR elements and electromagnetic transducers; and the surface of the magnetic record layer of the magnetic tape 11.

Next, as shown in FIG. 5b, when the heating element 31 is supplied with electric power, the heat generated from the heating element 31 causes especially the thermal expansion portion 32 to be thermally expanded; thus, the bottom surface 300 of the cavity 30 is moved toward the TBS 100 (in the −Z direction). As a result, the volume $V_C$ of the cavity 30 is decreased due to the decrease in depth (length in the Z-axis direction) of the cavity 30. Then, a desired magnetic spacing $d_{MS}$ can be obtained by setting the volume of the cavity 30 to be $V_{C1}$ (<$V_{C0}$), under the control of the electric power supplied to the heating element 31. Further, even in the case that the magnetic spacing $d_{MS}$ varies due to the change of conditions such as the change over time, the value of the varied magnetic spacing $d_{MS}$ can return to the desired one by further adjusting the volume of the cavity 30.

As shown in FIGS. 5a to 5c, by controlling the amount of electric power supplied to the heating element 31, the volume $V_C$ of the cavity 30 is adjusted; thus, any negative pressure in a predetermined range can be applied between the tape head 10 and the magnetic tape 11. Applying such a negative pressure enables the total pressure, including the suppress force working for contacting the tape head 10 with the magnetic tape 11, to be accordingly and dynamically controlled, in response to the change of conditions such as the change over time. As a result, the magnetic spacing $d_{MS}$ can be stably controlled, and further, the excessive wear of the head can be avoided. In addition, the volume of the cavity 30 can be quickly controlled by the heating element 31; therefore, responsive feedback controls of the above-described pressure can be performed by using the read output, as described in detail later.

Figure 6B:
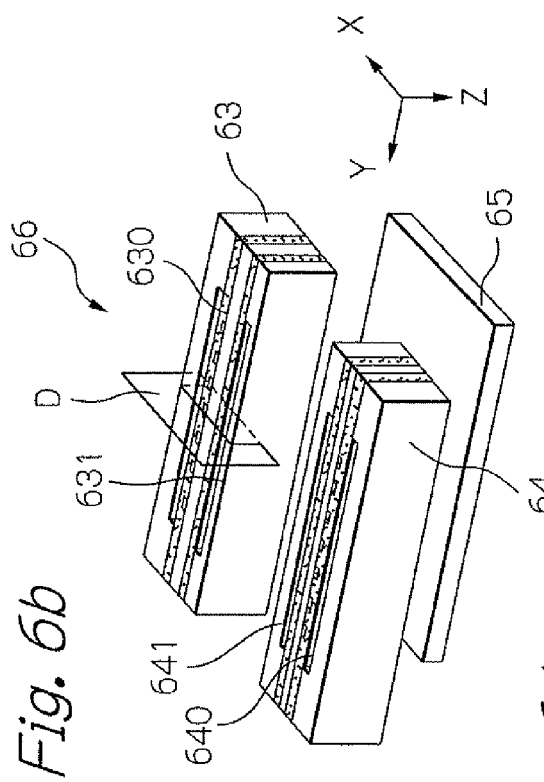
FIGS. 6a to 6c show perspective views schematically illustrating further another embodiment of the thin-film magnetic head according to the present invention.
Figure 6D:
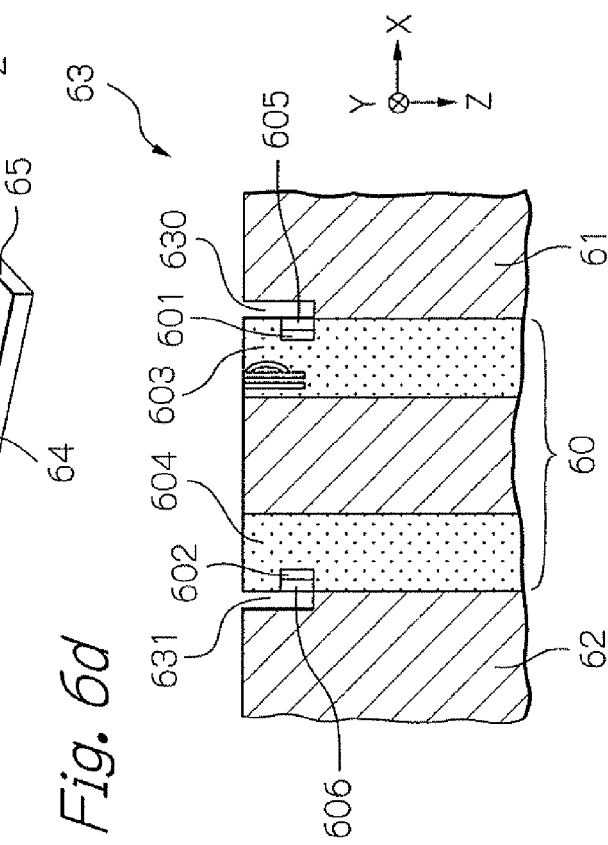
FIG. 6d shows a cross-sectional view taken by plane D shown in FIG. 6b, illustrating the structure of the first heat part.
Figure 6A:
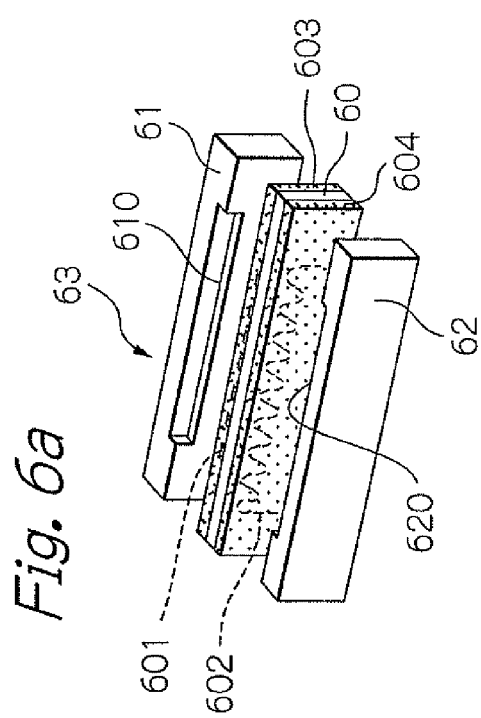
Figure 6C:
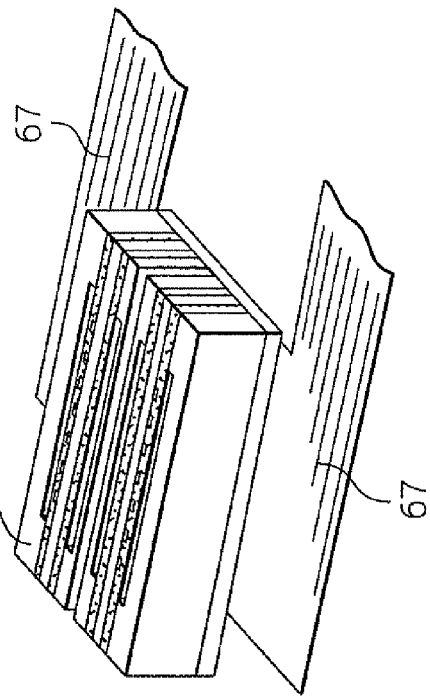

FIGS. 6a to 6c show perspective views schematically illustrating further another embodiment of the thin-film magnetic head according to the present invention. And FIG. 6d shows a cross-sectional view taken by plane D shown in FIG. 6b, illustrating the structure of the first heat part 63.

As shown in FIG. 6a, in this embodiment, the first head part 63 is formed by bonding an element substrate 60, a closure 61 and an additional closure 62 together. The element substrate 60 includes: a head substrate; MR elements, electromagnetic transducers and a heating element 601 formed on/above the element formation surface of the head substrate; an overcoat layer 603 covering these elements; an additional heating element 602 formed on/above the surface opposite to the element formation surface of the head substrate; and an additional overcoat layer 604 covering the additional heating element 602. The closure 61 is bonded on the upper surface of the overcoat layer 603, and the additional closure 62 is bonded on the additional overcoat layer 604.

The closure 61 has a wide groove 610 on the surface to be bonded to the element substrate 60. The groove 610 constitutes a cavity 630 (FIG. 6b) after the closure 61 is bonded to the element substrate 60. Further, The additional closure 62 also has a wide groove 620 on the surface to be bonded to the element substrate 60. The groove 620 constitutes a cavity 631 (FIG. 6b) after the additional closure 62 is bonded to the element substrate 60. Further, the second head part 64 (FIG. 6b) also has the same structure as the above-described first head part. Here, each of the cavities 630 and 631 may have the same size as the cavity 26 shown in FIGS. 3a and 3b.

The structure on the cross-section of the first head part 63 that has the above-described configuration will be explained by referring to FIG. 6d. As shown in FIG. 6d, the first head part 63 is provided with: the cavity 630 and the heating element 601 provided near the cavity 630; and the additional cavity 631 and the additional heating element 602 provided near the additional cavity 631. The cavity 630 and the additional cavity 631 are disposed in X-axis direction so as to sandwich the element substrate 60 therebetween; that is, they are disposed so that they can provide a balance of pressure in the direction along track, as described later. Further, also as shown in FIG. 6d, a thermal expansion portion 605 is preferably provided between the cavity 630 and the heating element 601, and an additional thermal expansion portion 606 is preferably provided between the additional cavity 631 and the additional heating element 602.

As shown in FIG. 6b, a tape head 66 includes: the first head part 63 that is formed as described above; the second head part 64 that has the same structure as the first head part 63; and a frame 65 bonded to the surfaces opposite to the TBS of these head parts. Further, as shown in FIG. 6c, wiring members 67 are attached to the tape head 66. The wiring members 67 electrically connect the MR elements for reading data, the electromagnetic transducers for writing data, and the heating element 601 and additional heating element 602 as volume-adjusting means with the recording/reproducing and cavity-volume control circuit 16 (FIG. 1*a*).

In the tape head 66, by controlling the amounts of heat generated from: the heating element and additional heating element of the first head part; and the heating element and additional heating element of the second head part, independently of one another, the volumes of: the cavity and additional cavity of the first head part; and the cavity and additional cavity of the second head part, can be adjusted independently of one another. As a result, the distribution of the pressure in the direction along track working between the tape head 66 and the magnetic tape can be controlled appropriately and reliably. Thereby, in each of the first and second head parts, the magnetic spacing at the positions of the ends of MR elements and electromagnetic transducers which are positioned between the cavity and the additional cavity, can be dynamically, accordingly and stably controlled, by balancing the pressure in the direction along track.

FIG. 7 shows a block diagram schematically illustrating a configuration of the recording/reproducing and cavity-volume control circuit 16 (FIG. 1*a*) provided in the magnetic tape apparatus according to the present invention.

As shown in FIG. 7, the recording/reproducing and cavity-volume control circuit 16 includes a head amplifier 70, a heater amplifier 71, a read/write (R/W) channel 72 connected to the head amplifier 70, a controller 73 connected to the R/W channel 72 and the heater amplifier 71, and an interface 74 connected to the controller 73.

The head amplifier 70, on the one hand, forms an read output signal by amplifying the read voltage outputted from the MR element 21, and then, sends the read output signal to the R/W channel 72; on the other hand, the head amplifier 70 forms an write current by amplifying the write input signal outputted from the R/W channel 72, and then, applies the write current to the electromagnetic transducer 22. The R/W channel 72, on the one hand, forms a data signal by code-demodulating the read output signal outputted from the head amplifier 70, and then, sends the data signal to the controller 73; on the other hand, the R/W channel 72 forms an write input signal by code-modulating the data signal outputted from the controller 73, and then, sends the write input signal to the head amplifier 70.

The controller 73, on the one hand, executes error correcting to the data signal outputted from the R/W channel 72, and then, sends the error-corrected data signal to an external host system through the interface 74; on the other hand, the controller 73 adds an error-correction code to the data signal received from the external host system through the interface 74, and then, sends the code-added data signal to the R/W channel 72.

Further, the controller 73 controls the amount of electric power for heating, which the heater amplifier 71 outputs to the heating element 27, according to the read output signal sent from the head amplifier 70. In this case, the read output signal may be a data signal or a servo signal. Specifically, the controller 73 first measures, for example, the amplitude of the received read output signal, a peak width at half height of the signal, or the average value of them; then, the controller 73 determines the magnetic spacing $d_{MS}$ at that time from the measurement result. Then, according to the estimate value, the controller 73 sends a control signal to the heater amplifier 71 so that the heater amplifier 71 provides the heating element 27 with heating electric power needed to correct the magnetic spacing $d_{MS}$ into a desired one.

As described above, by using the recording/reproducing and cavity-volume control circuit 16, the magnetic spacing $d_{MS}$ can be controlled accordingly and dynamically in response to the change of conditions such as the change over time. Further, the volume of the cavity 26 can be quickly controlled by the heating element 27; therefore, responsive feedback controls of the magnetic spacing $d_{MS}$ can be performed by using the read output.

Hereinafter, the effect of providing the cavity and volume-adjusting means will be explained by using practical examples in which read operations were performed with the thin-film magnetic heads according to the present invention.

In the practical examples, tape heads shown in FIG. 2 (FIGS. 3*a* and 3*b*) were used to read data. The number of the samples of tape heads was 32. The read operations were performed by using the MR elements 21 of the first head part 10*a* on the trailing side, while the magnetic tape 11 ran in the direction of arrow 12 in FIGS. 1*a* and 1*b*. In the read operations, the heating operation of the heating element 26 within each of the first and second head parts was controlled by using the recording/reproducing and cavity-volume control circuit 16, to set the magnetic spacings $d_{MS}$ in the first and second head parts to be the same value as each other. Whereas, as comparative examples, read operations were performed on the identical tape head by using the MR elements 21 of the first head part 10*a*, without any control of the magnetic spacing $d_{MS}$ by the heating element 27.

In the practical and comparative examples, read operations were performed on the magnetic tape 11 in which a predetermined record bits pattern was written, by using the MR elements 21 utilizing AMR effect in which sense current of 8 mA was applied. In the read operations, a peak width at half height PW50 of the read output signal was measured by using a magnetic tester. Then, the standard deviation $\sigma_{PW50}$ of the peak widths at half height PW50 was determined as a statistical result of ten measurements.

Figure 8:
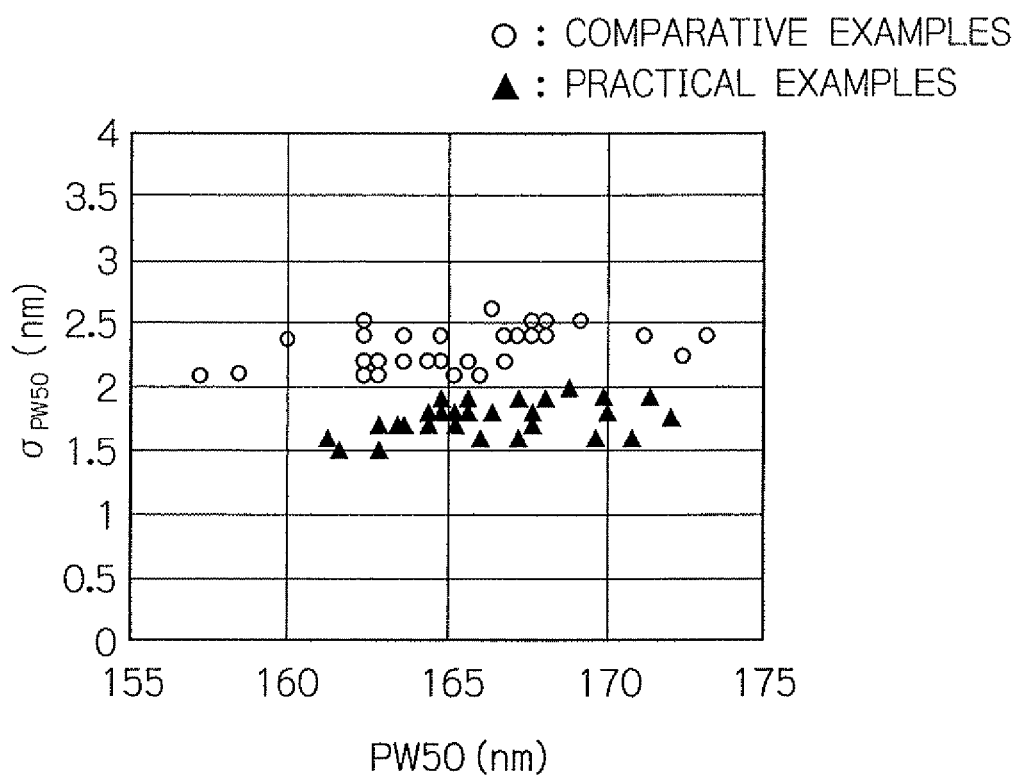
FIG. 8 shows a graph illustrating the peak width at half height PW50 and the standard deviation $\sigma_{PW50}$ of the read output signals in each of the tape heads of the practical and comparative examples.

FIG. 8 shows a graph illustrating the peak width at half height PW50 and the standard deviation $\sigma_{PW50}$ of the read output signals in each of the tape heads of the practical and comparative examples.

In the practical and comparative examples shown in FIG. 8, the peak widths at half height PW50 of the read output signals have various values in the range shown in the graph. Generally, a peak width PW50 relates to the value of magnetic spacing $d_{MS}$; the smaller the magnetic spacing $d_{MS}$ is, the smaller the peak width PW50 becomes. From that, the distribution of the peak widths PW50 shown in the graph denotes that the magnetic spacings $d_{MS}$ have a variation among heads. Here, the distribution range of the peak widths PW50 in the practical examples becomes narrower than that in the comparative examples. Therefore, it is understood that the variation among heads of the magnetic spacings $d_{MS}$ is more suppressed in the practical examples.

Next, the standard deviations $\sigma_{PW50}$ at respective peak widths PW50 will be compared between the practical and comparative examples. As clearly shown in FIG. 8, all the standard deviations $\sigma_{PW50}$ in the practical examples become smaller compared to the standard deviations $\sigma_{PW50}$ in the comparative examples. Actually, the average value of the standard deviations $\sigma_{PW50}$ in the practical examples is approximately 1.77 nm, whereas the average value of the standard deviations $\sigma_{PW50}$ in the comparative examples is approximately 2.29 nm. The smaller standard deviation $\sigma_{PW50}$ at a peak width PW50 denotes the less variation of the magnetic spacing $d_{MS}$ obtained in every read operation. As described above, it is understood that, in the practical examples, the magnetic spacing $d_{MS}$ is more stably controlled according to a predetermined set value of the magnetic spacing $d_{MS}$.

Furthermore, according to the above-described thin-film magnetic head of the present invention, a problem that the friction between the tape head and the magnetic tape is likely to increase significantly due to sticking at the start of the magnetic tape apparatus, can be dissolved, as well as controlling the magnetic spacing $d_{MS}$ dynamically and accordingly. This sticking between the head and the magnetic tape is likely to occur, especially in the case of leaving the apparatus not driven for a long time after backing up or restoring data. According to the thin-film magnetic head of the present invention, the friction at the start, which is larger than that during driving, can be reduced because the pressure working between the head and the magnetic tape can be adjusted.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head for reading data from a magnetic recording medium and/or writing data to a magnetic recording medium, comprising:
   at least one cavity for adjusting a negative pressure working between said thin-film magnetic head and said magnetic recording medium, provided in a surface of the thin-film magnetic head opposed to said magnetic recording medium, said at least one cavity having an opening positioned on said surface of the thin-film magnetic head, being aligned with and offset from the thin-film magnetic head in a direction in which the magnetic recording medium travels and being on a same side of the thin-film magnetic head with respect to an interface between the thin-film magnetic head and the magnetic recording medium, a volume of said at least one cavity being variable so as to adjust the negative pressure working between said thin-film magnetic head and said magnetic recording medium; and
   at least one volume-adjusting circuit that adjusts the volume of said at least one cavity.

2. The thin-film magnetic head as claimed in claim 1, wherein said thin-film magnetic head further comprises:
   at least one magnetic head element for reading and/or writing data, formed on/above an element formation surface of a substrate;
   an overcoat layer formed on the element formation surface so as to cover said at least one magnetic head element; and
   a closure bonded on at least a portion of an upper surface of said overcoat layer,
   said at least one cavity being provided in a sliding surface of the thin-film magnetic head, said sliding surface being to slide on said magnetic recording medium.

3. The thin-film magnetic head as claimed in claim 2, further comprising at least one thermal expansion portion formed of a material with a coefficient of linear expansion larger than coefficients of linear expansion of said overcoat layer and said closure, positioned adjacent to said at least one cavity.

4. The thin-film magnetic head as claimed in claim 3, wherein said at least one thermal expansion portion is provided between said at least one cavity and said at least one volume-adjusting circuit.

5. The thin-film magnetic head as claimed in claim 4, wherein said at least one volume-adjusting circuit is provided adjacent to said at least one cavity, on a substrate side or the opposite side in relation to said at least one cavity.

6. The thin-film magnetic head as claimed in claim 3, wherein: said at least one thermal expansion portion is provided adjacent to said at least one cavity, on a side opposite to the sliding surface in relation to said at least one cavity; and said at least one volume-adjusting circuit is provided at the back of said at least one thermal expansion portion when viewed from the sliding surface side.

7. The thin-film magnetic head as claimed in claim 3, wherein: said at least one thermal expansion portion is provided adjacent to said at least one cavity, on a side opposite to the sliding surface in relation to said at least one cavity; and said at least one volume-adjusting circuit is provided adjacent to said at least one thermal expansion portion, on a substrate side or the opposite side in relation to said at least one thermal expansion portion.

8. The thin-film magnetic head as claimed in claim 2, wherein said at least one cavity is provided, fronting on a boundary between said overcoat layer and said closure.

9. The thin-film magnetic head as claimed in claim 1, wherein said at least one volume-adjusting circuit is at least one heating element.

10. The thin-film magnetic head as claimed in claim 1, wherein said at least one volume-adjusting circuit is at least one piezoelectric element.

11. The thin-film magnetic head as claimed in claim 1, wherein said thin-film magnetic head comprises:
   at least one magnetic head element for reading and/or writing data, formed on/above an element formation surface of a substrate;
   an overcoat layer formed on the element formation surface so as to cover said at least one magnetic head element;
   a closure bonded on at least a portion of an upper surface of said overcoat layer;
   an additional overcoat layer formed on a surface opposite to the element formation surface of the substrate;
   an additional closure bonded on at least a portion of an upper surface of said additional overcoat layer;
   said at least one cavity provided in the surface opposed to said magnetic recording medium, fronting on a boundary between said overcoat layer and said closure;
   said at least one volume-adjusting circuit for adjusting the volume of said at least one cavity, provided within said overcoat layer;
   at least one additional cavity provided in the surface opposed to said magnetic recording medium, fronting on a boundary between said additional overcoat layer and said additional closure; and
   at least one additional volume-adjusting circuit for adjusting a volume of said at least one additional cavity, provided within said additional overcoat layer.

12. A magnetic tape apparatus comprising: at least one thin-film magnetic head for reading data from at least one magnetic tape and/or writing data to at least one magnetic tape; and a control circuit for controlling read and/or write operations performed by said at least one thin-film magnetic head,
   the thin-film magnetic head comprising:
   at least one magnetic head element for reading and/or writing data, formed on/above an element formation surface of a substrate;
   an overcoat layer formed on the element formation surface so as to cover said at least one magnetic head element;
   a closure bonded on at least a portion of an upper surface of said overcoat layer;

at least one cavity for adjusting a negative pressure working between said thin-film magnetic head and said magnetic tape, provided in a sliding surface of the thin-film magnetic head opposed to said magnetic tape, said at least one cavity having an opening positioned on said sliding surface of the thin-film magnetic head, being aligned with and offset from the thin-film magnetic head in a direction in which the magnetic tape travels and being on a same side of the thin-film magnetic head with respect to an interface between the thin-film magnetic head and the magnetic tape, a volume of said at least one cavity being variable so as to adjust the negative pressure working between said thin-film magnetic head and said magnetic tape; and at least one volume-adjusting circuit that adjusts the volume of said at least one cavity, said magnetic tape apparatus further comprising a volume control circuit for controlling operations of said at least one volume-adjusting circuit.

13. The magnetic tape apparatus as claimed in claim 12, wherein said at least one volume-adjusting circuit is at least one heating element.

14. The magnetic tape apparatus as claimed in claim 13, further comprising at least one thermal expansion portion formed of a material with a coefficient of linear expansion larger than coefficients of linear expansion of said overcoat layer and said closure, positioned adjacent to said at least one cavity.

15. The magnetic tape apparatus as claimed in claim 14, wherein said at least one thermal expansion portion is provided between said at least one cavity and said at least one volume-adjusting circuit.

16. The magnetic tape apparatus as claimed in claim 15, wherein said at least one volume-adjusting circuit is provided adjacent to said at least one cavity, on a substrate side or the opposite side in relation to said at least one cavity.

17. The magnetic tape apparatus as claimed in claim 14, wherein: said at least one thermal expansion portion is provided adjacent to said at least one cavity, on a side opposite to the sliding surface in relation to said at least one cavity; and said at least one volume-adjusting circuit is provided at the back of said at least one thermal expansion portion when viewed from the sliding surface side.

18. The magnetic tape apparatus as claimed in claim 14, wherein: said at least one thermal expansion portion is provided adjacent to said at least one cavity, on a side opposite to the sliding surface in relation to said at least one cavity; and said at least one volume-adjusting circuit is provided adjacent to said at least one thermal expansion portion, on a substrate side or the opposite side in relation to said at least one thermal expansion portion.

19. The magnetic tape apparatus as claimed in claim 12, wherein said at least one volume-adjusting circuit is at least one piezoelectric element.

20. The magnetic tape apparatus as claimed in claim 12, wherein said at least one cavity is provided, fronting on a boundary between said overcoat layer and said closure.

21. The magnetic tape apparatus as claimed in claim 12, wherein said thin-film magnetic head comprises:

an additional overcoat layer formed on a surface opposite to the element formation surface of the substrate;

an additional closure bonded on at least a portion of an upper surface of said additional overcoat layer;

said at least one cavity provided in said surface opposed to said magnetic tape, fronting on a boundary between said overcoat layer and said closure;

said at least one volume-adjusting circuit for adjusting the volume of said at least one cavity, provided within said overcoat layer;

at least one additional cavity provided in the surface opposed to said magnetic tape, fronting on a boundary between said additional overcoat layer and said additional closure; and at least one additional volume-adjusting circuit for adjusting a volume of said at least one additional cavity, provided within said additional overcoat layer, said volume control circuit being provided for controlling operations of said at least one volume-adjusting circuit and said at least one additional volume-adjusting circuit.

22. A controlling method of a magnetic spacing, comprising the step of adjusting a negative pressure working between a thin-film magnetic head and a magnetic recording medium by adjusting a volume of at least one cavity provided in a surface of said thin-film magnetic head, the surface being opposed to said magnetic recording medium, said at least one cavity having an opening positioned on said surface of the thin-film magnetic head, being aligned with and offset from the thin-film magnetic head in a direction in which the magnetic recording medium travels and being on a same side of the thin-film magnetic head with respect to an interface between the thin-film magnetic head and the magnetic recording medium, the volume of said at least one cavity being variable so as to adjust the negative pressure working between said thin-film magnetic head and said magnetic recording medium, said thin-film magnetic head further including at least one volume-adjusting circuit that adjusts the volume of said at least one cavity.

23. The controlling method as claimed in claim 22, wherein at least one heating element is used for adjusting the volume of said at least one cavity.

24. The controlling method as claimed in claim 22, wherein at least one piezoelectric element is used for adjusting the volume of said at least one cavity.

* * * * *